United States Patent
Liu et al.

(10) Patent No.: US 11,025,296 B2
(45) Date of Patent: Jun. 1, 2021

(54) NESTED FREQUENCY HOPPING FOR DATA TRANSMISSION

(71) Applicant: QUALCOMM Incorporated, San Diego, CA (US)

(72) Inventors: Chih-Hao Liu, San Diego, CA (US); Srinivas Yerramalli, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 25 days.

(21) Appl. No.: 16/255,645

(22) Filed: Jan. 23, 2019

(65) Prior Publication Data

US 2019/0238177 A1 Aug. 1, 2019

Related U.S. Application Data

(60) Provisional application No. 62/623,987, filed on Jan. 30, 2018.

(51) Int. Cl.
*H04W 24/08* (2009.01)
*H04B 1/713* (2011.01)
(Continued)

(52) U.S. Cl.
CPC .......... *H04B 1/713* (2013.01); *H04B 7/2643* (2013.01); *H04L 5/0012* (2013.01);
(Continued)

(58) Field of Classification Search
None
See application file for complete search history.

(56) References Cited

U.S. PATENT DOCUMENTS 7,054,346 B2 * 5/2006 Balachandran ...... H04B 1/7143
370/287
2014/0204844 A1 7/2014 Hryciuk et al.
(Continued)

FOREIGN PATENT DOCUMENTS

CN 107046721 A 8/2017

OTHER PUBLICATIONS

Partial International Search Report— PCT/US2019/014996—ISA/EPO—dated Apr. 15, 2019.
(Continued)

*Primary Examiner* — Sithu Ko
(74) *Attorney, Agent, or Firm* — Liem T. Do

(57) ABSTRACT

Methods, systems, and devices for wireless communications are described. A user equipment (UE) may receive a discovery reference signal from a base station on an anchor channel. The UE may perform a first random or pseudorandom frequency hopping procedure to identify a plurality of downlink carriers for a first time period. The UE may perform a second random or pseudorandom frequency hopping procedure within the plurality of downlink carriers to select one of the plurality of downlink carriers as the uplink channel for a second time period. The UE may then transmit an uplink communication during the second time period on the selected uplink channel. In some examples, the uplink communication may be transmitted based at least in part on time division multiplexing (TDM) information.

22 Claims, 18 Drawing Sheets

(51) Int. Cl.
*H04W 72/04* (2009.01)
*H04B 7/26* (2006.01)
*H04L 12/413* (2006.01)
*H04L 5/00* (2006.01)
*H04L 12/46* (2006.01)
*H04J 11/00* (2006.01)

(52) U.S. Cl.
CPC .......... *H04L 5/0037* (2013.01); *H04L 12/413* (2013.01); *H04L 12/4625* (2013.01); *H04W 72/044* (2013.01); *H04J 11/0026* (2013.01); *H04L 5/001* (2013.01)

(56) References Cited

U.S. PATENT DOCUMENTS

| | | | | |
|---|---|---|---|---|
| 2016/0249297 A1* | 8/2016 | Oh | | H04W 52/143 |
| 2017/0164350 A1* | 6/2017 | Sun | | H04W 76/27 |
| 2017/0208591 A1* | 7/2017 | Rico Alvarino | | H04L 5/0039 |
| 2017/0238284 A1* | 8/2017 | Tseng | | H04W 72/0453 |
| | | | | 370/329 |
| 2018/0020360 A1* | 1/2018 | Yerramalli | | H04W 72/0453 |
| 2018/0069593 A1* | 3/2018 | Yl | | H04B 1/713 |
| 2018/0213468 A1* | 7/2018 | Chatterjee | | H04L 5/0053 |
| 2018/0287845 A1* | 10/2018 | Kim | | H04L 27/2666 |
| 2019/0044676 A1* | 2/2019 | Li | | H04L 5/0048 |
| 2019/0045372 A1* | 2/2019 | Niu | | H04W 16/14 |
| 2019/0045553 A1 | 2/2019 | Zhang et al. | | |
| 2019/0075581 A1* | 3/2019 | Salem | | H04W 72/1289 |
| 2020/0014421 A1* | 1/2020 | Alexander | | H04B 1/713 |
| 2020/0029392 A1* | 1/2020 | Ye | | H04W 16/14 |

OTHER PUBLICATIONS

International Search Report and Written Opinion—PCT/US2019/014996—ISA/EPO—dated Jun. 13, 2019.

* cited by examiner

NESTED FREQUENCY HOPPING FOR DATA TRANSMISSION

CROSS REFERENCE

The present Application for Patent claims the benefit of U.S. Provisional Patent Application No. 62/623,987 by LIU, et al., entitled "NESTED FREQUENCY HOPPING FOR DATA TRANSMISSION," filed Jan. 30, 2018, assigned to the assignee hereof, and expressly incorporated herein by reference in its entirety.

BACKGROUND

The following relates generally to wireless communication, and more specifically to frequency hopping for data transmission.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Narrowband communications involve communicating with a limited frequency bandwidth as compared to the frequency bandwidth used for LTE communications. One example of narrowband communication is narrowband (NB) Internet of Things (IoT) (NB-IoT) communication, which may be limited to a single resource block (RB) of system bandwidth, e.g., 180 kHz. Another example of narrowband communication is enhanced machine-type communication (eMTC), which may be limited to six RBs of system bandwidth, e.g., 1.08 MHz. NB-IoT communication and/or eMTC may reduce device complexity, enable multi-year battery life, and provide deeper coverage to reach challenging locations such as deep inside buildings.

SUMMARY

The described techniques relate to improved methods, systems, devices, or apparatuses that support nested frequency hopping for data transmission. Generally, the described techniques provide for systems and methods for selecting an uplink channel for uplink communications. A user equipment (UE) may receive a discovery reference signal from a base station on an anchor channel. The UE may perform a first random or pseudorandom frequency hopping procedure to identify a plurality of downlink carriers for a first time period. The UE may perform a second random or pseudorandom frequency hopping procedure within the plurality of downlink carriers to select one of the plurality of downlink carriers as the uplink channel for a second time period. For example, the UE may randomly or pseudo-randomly select one of the plurality of downlink carriers as the uplink channel, randomly or pseudo-randomly select a permutation of the plurality of downlink carriers and select the uplink channel based at least in part on the selected permutation, or randomly or pseudo-randomly select a primary channel as the uplink channel. The UE may then transmit an uplink communication during the second time period on the selected uplink channel. In some examples, the uplink communication may be transmitted based at least in part on time division multiplexing (TDM) information.

A method of wireless communication is described. The method may include receiving, by a wireless device, a discovery reference signal on at least one anchor carrier, performing a first random or pseudorandom frequency hopping procedure to identify a plurality of downlink carriers for a first time period, performing a second random or pseudorandom frequency hopping procedure within the plurality of downlink carriers to select one of the plurality of downlink carriers as an uplink channel for a second time period, and transmitting an uplink communication on the selected uplink channel during the second time period.

An apparatus for wireless communication is described. The apparatus may include means for receiving, by a wireless device, a discovery reference signal on at least one anchor carrier, means for performing a first random or pseudorandom frequency hopping procedure to identify a plurality of downlink carriers for a first time period, means for performing a second random or pseudorandom frequency hopping procedure within the plurality of downlink carriers to select one of the plurality of downlink carriers as an uplink channel for a second time period, and means for transmitting an uplink communication on the selected uplink channel during the second time period.

Another apparatus for wireless communication is described. The apparatus may include a processor, memory in electronic communication with the processor, and instructions stored in the memory. The instructions may be operable to cause the processor to receive, by a wireless device, a discovery reference signal on at least one anchor carrier, perform a first random or pseudorandom frequency hopping procedure to identify a plurality of downlink carriers for a first time period, perform a second random or pseudorandom frequency hopping procedure within the plurality of downlink carriers to select one of the plurality of downlink carriers as an uplink channel for a second time period, and transmit an uplink communication on the selected uplink channel during the second time period.

A non-transitory computer-readable medium for wireless communication is described. The non-transitory computer-readable medium may include instructions operable to cause a processor to receive, by a wireless device, a discovery reference signal on at least one anchor carrier, perform a first random or pseudorandom frequency hopping procedure to identify a plurality of downlink carriers for a first time period, perform a second random or pseudorandom frequency hopping procedure within the plurality of downlink carriers to select one of the plurality of downlink carriers as an uplink channel for a second time period, and transmit an uplink communication on the selected uplink channel during the second time period.

Some examples of the method, apparatus, and non-transitory computer-readable medium described above may further include processes, features, means, or instructions for receiving a downlink communication for the wireless device on a downlink channel of the plurality of downlink carriers, where the uplink channel may be different than the downlink channel.

In some examples of the method, apparatus, and non-transitory computer-readable medium described above, performing the second random or pseudo-random frequency hopping procedure within the plurality of downlink carriers may include randomly or pseudo-randomly selecting the one of the plurality of downlink carriers.

In some examples of the method, apparatus, and non-transitory computer-readable medium described above, performing the second random or pseudo-random frequency hopping procedure within the plurality of downlink carriers may include randomly or pseudo-randomly selecting a permutation of the plurality of downlink carriers. Some examples of the method, apparatus, and non-transitory computer-readable medium described above may further include processes, features, means, or instructions for selecting the uplink channel based at least in part on the permutation.

In some examples of the method, apparatus, and non-transitory computer-readable medium described above, performing the second random or pseudo-random frequency hopping within the plurality of downlink carriers may include randomly or pseudo-randomly selecting a primary channel as the uplink channel.

In some examples of the method, apparatus, and non-transitory computer-readable medium described above, performing the second random or pseudo-random frequency hopping procedure within the plurality of downlink carriers may include selecting the one of the plurality of downlink carriers based at least in part on a random or pseudo-random number generator.

In some examples of the method, apparatus, and non-transitory computer-readable medium described above, performing the second random or pseudo-random frequency hopping procedure within the plurality of downlink carriers may include selecting one of a plurality of data channels based at least in part on a random or pseudo-random hopping pattern.

Some examples of the method, apparatus, and non-transitory computer-readable medium described above may further include processes, features, means, or instructions for receiving, from a base station, time division multiplexing information for the uplink channel.

In some examples of the method, apparatus, and non-transitory computer-readable medium described above, the uplink communication may be transmitted based at least in part on the time division multiplexing information.

In some examples of the method, apparatus, and non-transitory computer-readable medium described above, the first time period and the second time period may be in a same frame.

Some examples of the method, apparatus, and non-transitory computer-readable medium described above may further include processes, features, means, or instructions for performing a third random or pseudorandom frequency hopping procedure within the plurality of downlink carriers to select a second one of the plurality of downlink carriers as a second uplink channel for a third time period. Some examples of the method, apparatus, and non-transitory computer-readable medium described above may further include processes, features, means, or instructions for transmitting a second uplink communication on the selected second uplink channel during the third time period, where the third time period may be in the same frame.

In some examples of the method, apparatus, and non-transitory computer-readable medium described above, each of the plurality of downlink carriers may include a resource block.

Some examples of the method, apparatus, and non-transitory computer-readable medium described above may further include processes, features, means, or instructions for receiving, by the wireless device, a second discovery reference signal on the at least one anchor channel. Some examples of the method, apparatus, and non-transitory computer-readable medium described above may further include processes, features, means, or instructions for performing a third random or pseudorandom frequency hopping procedure to identify a second plurality of downlink carriers for a third time period. Some examples of the method, apparatus, and non-transitory computer-readable medium described above may further include processes, features, means, or instructions for performing a fourth random or pseudorandom frequency hopping procedure within the plurality of downlink carriers to select one of the second plurality of downlink carriers as a second uplink channel for a fourth time period. Some examples of the method, apparatus, and non-transitory computer-readable medium described above may further include processes, features, means, or instructions for transmitting a second uplink communication on the selected second uplink channel during the fourth time period, where the first time period and the second time period may be in a different frame than the third time period and the fourth time period.

A method of wireless communication is described. The method may include transmitting, by a wireless device, a discovery reference signal on at least three anchor carriers, performing a first random or pseudorandom frequency hopping procedure to select a plurality of downlink carriers for a first time period, identifying an anticipated collision of uplink transmissions from user equipment (UEs) during a second time period based at least in part on a second random or pseudorandom frequency hopping procedure within the plurality of downlink carriers, and transmitting time division multiplexing information for the second time period to the UEs.

An apparatus for wireless communication is described. The apparatus may include means for transmitting, by a wireless device, a discovery reference signal on at least three anchor carriers, means for performing a first random or pseudorandom frequency hopping procedure to select a plurality of downlink carriers for a first time period, means for identifying an anticipated collision of uplink transmissions from user equipment (UEs) during a second time period based at least in part on a second random or pseudorandom frequency hopping procedure within the plurality of downlink carriers, and means for transmitting time division multiplexing information for the second time period to the UEs.

Another apparatus for wireless communication is described. The apparatus may include a processor, memory in electronic communication with the processor, and instructions stored in the memory. The instructions may be operable to cause the processor to transmit, by a wireless device, a discovery reference signal on at least three anchor carriers, perform a first random or pseudorandom frequency hopping procedure to select a plurality of downlink carriers for a first time period, identify an anticipated collision of uplink transmissions from user equipment (UEs) during a second time period based at least in part on a second random or pseudorandom frequency hopping procedure within the plurality of downlink carriers, and transmit time division multiplexing information for the second time period to the UEs.

A non-transitory computer-readable medium for wireless communication is described. The non-transitory computer-readable medium may include instructions operable to cause a processor to transmit, by a wireless device, a discovery reference signal on at least three anchor carriers, perform a first random or pseudorandom frequency hopping procedure to select a plurality of downlink carriers for a first time period, identify an anticipated collision of uplink transmissions from user equipment (UEs) during a second time period based at least in part on a second random or pseudorandom frequency hopping procedure within the plurality of downlink carriers, and transmit time division multiplexing information for the second time period to the UEs.

Some examples of the method, apparatus, and non-transitory computer-readable medium described above may further include processes, features, means, or instructions for receiving the uplink transmissions over the selected uplink channel during the second time period based at least in part on the time division multiplexing information.

Some examples of the method, apparatus, and non-transitory computer-readable medium described above may further include processes, features, means, or instructions for transmitting a downlink communication on at least one of the plurality of downlink carriers, where the downlink communication may include the time division multiplexing information.

DETAILED DESCRIPTION

Figure 1:
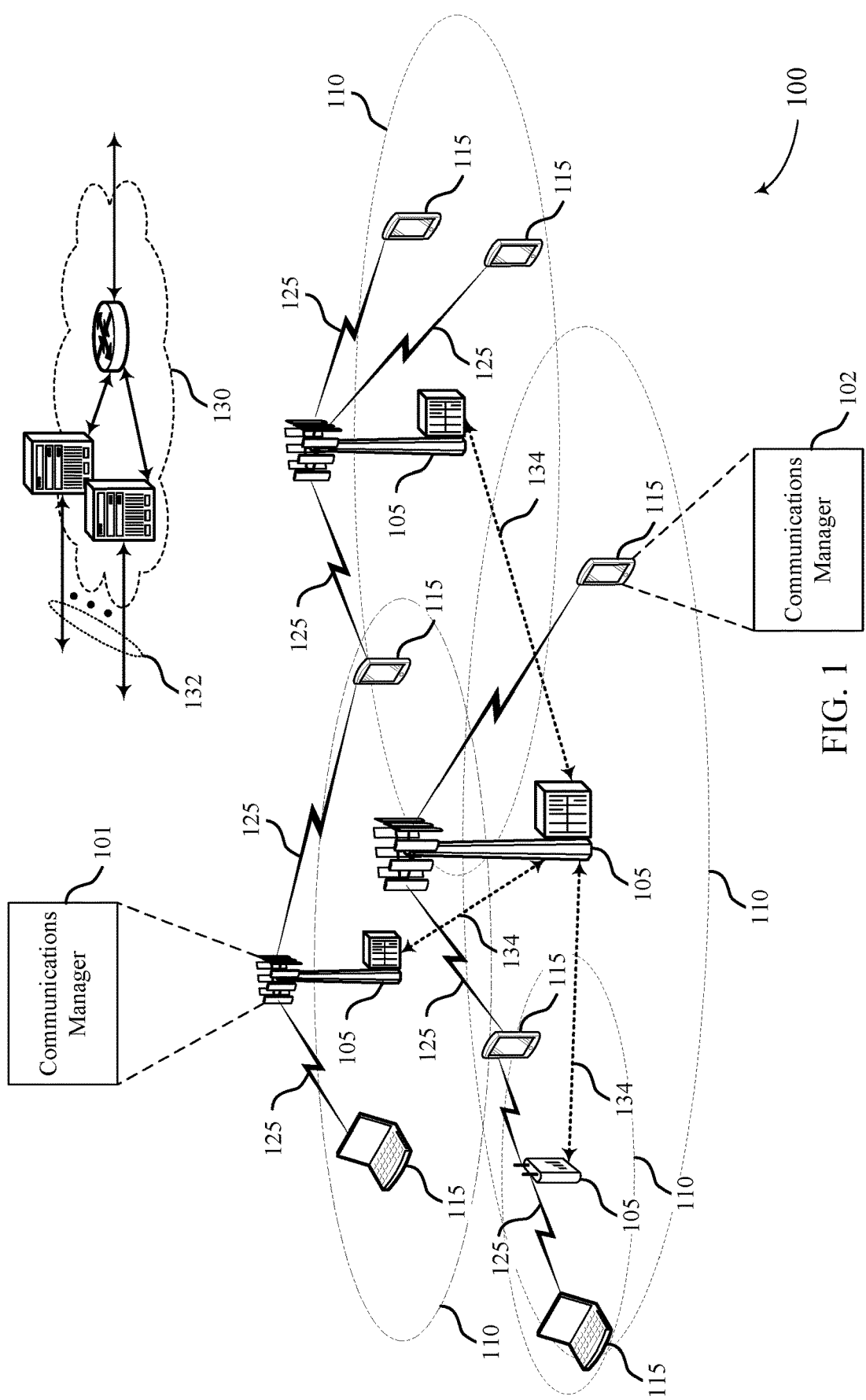
FIG. 1 illustrates an example of a system for wireless communication that supports nested frequency hopping for data transmission in accordance with aspects of the present disclosure.

Frequency hopping techniques may be used in connection with NB-IoT communications. For example, a base station and associated user equipment (UEs) may perform a frequency hopping procedure to select a number of data channels for downlink and uplink communications. For example, for communications between a base station and three associated UEs, the frequency hopping procedure may be used to identify three channels for both downlink and uplink communications.

However, such a scheme may disadvantage one of the UEs. For example, the frequency hopping procedure may be used to identify three channels for communications. The first channel may be assigned for communications between the base station and a first UE, the second channel may be assigned for communications between the base station and a second UE, and the third channel may be assigned for communications between the base station and a third UE. However, the second channel may experience interference such that communications between the base station and the second UE are not possible. In such situations, the second UE cannot receive downlink communications or transmit uplink communications, and that entire time period may be wasted from the perspective of the second UE.

In order to decrease the number of wasted time periods, each UE may perform a random or pseudorandom frequency hopping procedure within the selected downlink carriers to select an uplink channel. Each UE may then transmit an uplink communication on the selected uplink channel. In this manner, even if the UE is unable to receive downlink communications from the base station, it may be able to transmit uplink communications because the uplink channel may be different than the downlink channel.

In some examples, the second random or pseudorandom frequency hopping procedure may include randomly or pseudo-randomly selecting an uplink channel from the plurality of downlink carriers. In some examples, the second random or pseudorandom frequency hopping procedure may include randomly or pseudo-randomly selecting a permutation of the plurality of downlink carriers, and then selecting the uplink channel based at least in part on the selected permutation. In some examples, the second random or pseudorandom frequency hopping procedure may include randomly or pseudo-randomly selecting a primary channel.

In some examples, one or more of the UEs may select the same channel as the uplink channel. In order to avoid a wasted uplink time period due to collisions from another UE in the same cell, the base station may provide time division multiplexing (TDM) information to the one or more UEs. The one or more UEs may then transmit uplink communications on a common selected uplink channel based at least in part on the TDM information.

Aspects of the disclosure are initially described in the context of a wireless communications system. Aspects of the disclosure are further illustrated by and described with reference to apparatus diagrams, system diagrams, and flowcharts that relate to nested frequency hopping for data transmission.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RB s) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.)

at reduced symbol durations (e.g., 16.67 microseconds). A TTI in eCC may include one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

One or more of the base stations 105 may include a communications manager 101, which may transmit a reference signal on one or more anchor channels at the start of a frame (e.g., an m-frame). The communications manager 101 may also perform a first random or pseudorandom frequency hopping procedure to identify a plurality of downlink carriers for downlink segments of the frame. The communications manager 101 may transmit downlink communications to one or more UEs 115 during downlink segments of the frame using the identified plurality of downlink carriers.

The communications manager 101 may identify an anticipated collision between two or more UEs 115 during an uplink segment of the frame. The communications manager 101 may identify the anticipated collision for an upcoming uplink segment based at least in part on the selection procedure (e.g., algorithm) used by the UEs 115 for the upcoming uplink segment. The communications manager 101 may transmit time division multiplexing (TDM) information to the UEs 115 based at least in part on the identified anticipated collision. In some examples, the communications manager 101 may transmit the TDM information to the UEs 115 in the downlink communications.

UEs 115 may include a communications manager 102, which may perform a first random or pseudorandom frequency hopping procedure to identify a first plurality of downlink carriers for downlink segments of a first frame. The communications manager 102 may also perform a second random or pseudorandom frequency hopping procedure within the first plurality of downlink carriers to select an uplink channel for an uplink segment of the first frame.

In some examples, the second random or pseudorandom frequency hopping procedure may include randomly or pseudo-randomly selecting an uplink channel from the first plurality of downlink carriers. In some examples, the second random or pseudorandom frequency hopping procedure may include randomly or pseudo-randomly selecting a permutation of the first plurality of downlink carriers, and then selecting the uplink channel based at least in part on the selected permutation. In some examples, the second random or pseudorandom frequency hopping procedure may include randomly or pseudo-randomly selecting a primary channel.

The communications manager 102 may transmit an uplink communication on the selected uplink channel during the uplink segment of the first frame. In some examples, the first frame may include two or more uplinks segments. The communications manager 102 may perform a random or pseudorandom frequency hopping procedure for each uplink segment. For example, the communications manager 102 may perform a third random or pseudorandom frequency hopping procedure within the first plurality of downlink carriers to select a second uplink channel for a second uplink segment of the first frame. The third random or pseudorandom frequency hopping procedure may use the same selection procedure (e.g., algorithm) as the second random or pseudorandom frequency hopping procedure.

In some examples, the communications manager 102 may receive TDM information for an uplink segment (e.g., in a downlink communication from a base station 105). In such examples, the communications manager 102 may transmit the uplink communication during the uplink segment based at least in part on the TDM information. In some cases, forcing uplink transmission to be TDM'ed on a single carrier may hit the uplink capacity.

Figure 2:
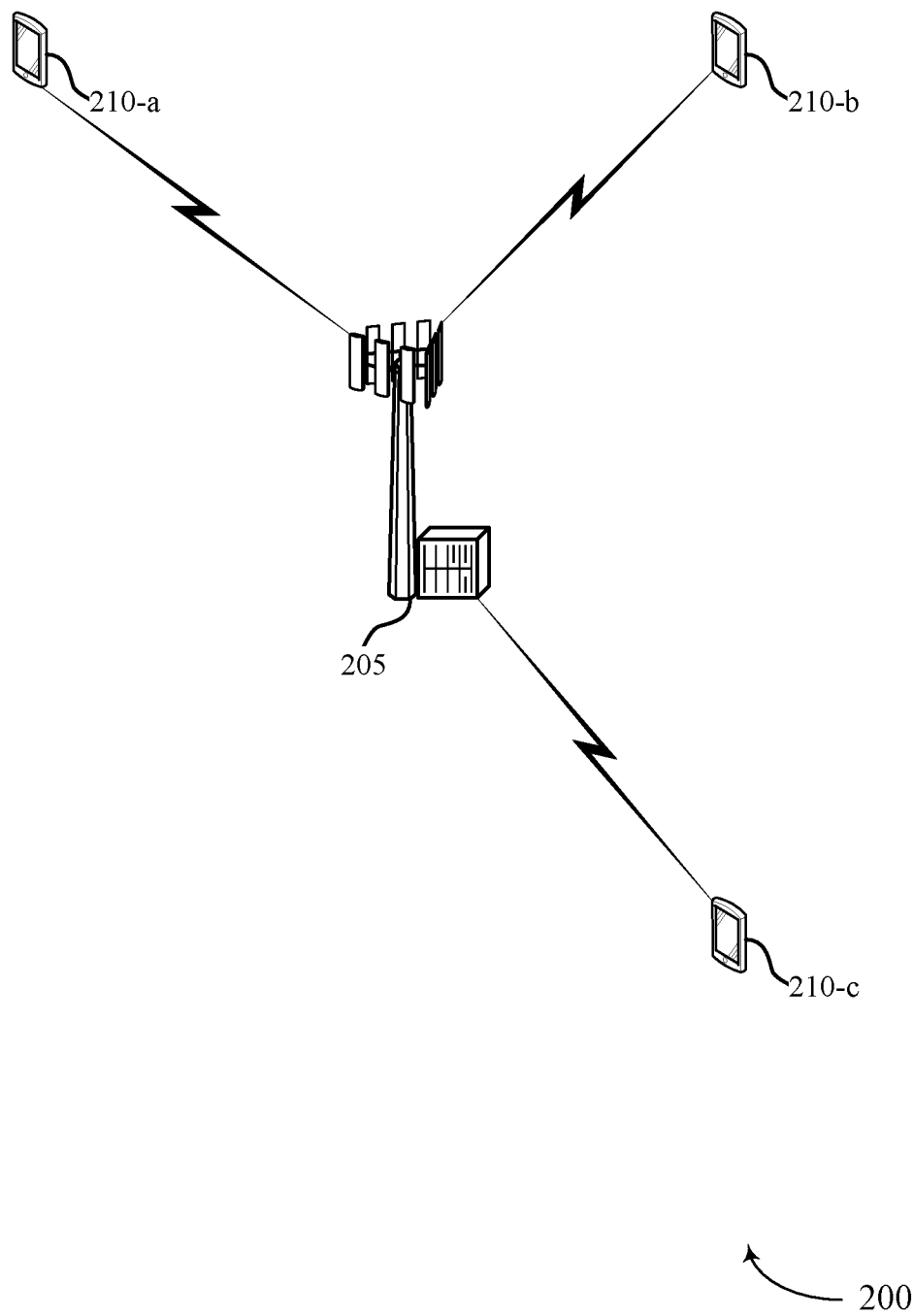
FIG. 2 illustrates an example of a wireless communications system that supports nested frequency hopping for data transmission in accordance with aspects of the present disclosure.

FIG. 2 illustrates an example of a wireless communications system 200 that supports nested frequency hopping for data transmission in accordance with various aspects of the present disclosure. In some examples, the wireless communications system 200 may implement aspects of wireless communications system 100.

The wireless communications system 200 may include a serving base station 205, which may be an example of aspects of base station 105 as described with reference to FIG. 1. The wireless communications system 200 may also include a plurality of served UEs 210 including a first UE 210-a, a second UE 215-a, and a third UE 220-a. The served UEs 210 may be examples of aspects of UEs 115 as described with reference to FIG. 1.

Each UE 210 may receive downlink communications from the base station 205 and may transmit uplink communications to base station 205. The UE 210 may communicate with the base station 205 according to a frame structure including at least one downlink segment and at least one uplink segment. The frame structure may be, for example, an m-frame structure.

At the start of each frame, the base station 205 may transmit a discovery reference signal (DRS) on at least one anchor channel. For example, the base station 205 may transmit a DRS on at least three anchor channels or carriers simultaneously. Each anchor channel may correspond to one resource block. The anchor channels may be resource blocks that are designated for transmitting a DRS and that are used exclusively or primarily for the transmission of the DRS and other control signals. The resource blocks used for the anchor channels may be known to the base station 205 and the plurality of UEs 210 before the DRS is transmitted. For example, the base station 205 may identify the anchor channels when one of the UEs 210 joins the cell. In some examples, the DRS may have a standard duration such as 10 milliseconds or 20 milliseconds.

The base station 205 may then transmit downlink communications to the plurality of UEs 210 during the downlink segment of the first frame. In some examples, the base station 205 and the UEs 210 may be capable of communicating on a number of different channels (e.g., resource bands). The base station 205 may select three of the available n channels, e.g., to satisfy a minimum bandwidth constraint such as the FCC minimum bandwidth restraint for a shared spectrum. In some examples, each channel may serve a UE, e.g., the three channels may serve the three UEs 210. In some other examples, the three channels may serve three sets of UEs. The base station 205 and UEs 210 may use frequency hopping procedures to select the channels on which they will communicate.

The base station 205 and the UEs 210 may each perform a first random or pseudorandom frequency hopping procedure (e.g., a first stage or level of random hopping) to select a first plurality of downlink carriers for the first frame. In some examples, the first plurality of downlink carriers may include a plurality of contiguous channels. The base station 205 may communicate with each of the UEs 210 using one of the first plurality of downlink carriers. In some cases, a UE 210 may perform the first stage of random hopping for a group of M frequencies, where M is an integer, according to a hopping pattern determined by the base station 205, and the UE 210 may receive downlink control and/or data on a designated carrier.

Each UE 210 may then perform second random or pseudorandom frequency hopping procedure within the first plurality of downlink carriers to select an uplink carrier for the uplink segment of the first frame. Each UE 210 may randomly or pseudo-randomly select an uplink carrier based at least in part on a random or pseudorandom number generator, or a random or pseudorandom pattern. For example, the random generator for each carrier may pick one of the M hopping frequencies from the first level of hopping. In some examples, the selection of an uplink carrier at one of the UEs 210 (e.g., first UE 210-a) may be independent of the selection of the uplink carrier at the other UEs 210 in the wireless communications system 200 (e.g., second UE 210-b and third UE 210-c). In some examples, UEs 210 on a same downlink carriers may pick a same hopping pattern. In some other examples, each UE 210 may use a common algorithm to select the uplink carrier (e.g., to select a common primary carrier or a common permutation).

In some examples, each UE 210 may randomly or pseudo-randomly select the uplink channel from the first plurality of downlink carriers. For example, the first plurality of downlink carriers may include three channels A, B, and C. Each UE 210 may randomly or pseudo-randomly select one of the three channels. For example, the first UE 210-a may select channel B, the second UE 210-b may select channel C, and the third UE 210-c may select channel A. The UEs 210 may then transmit an uplink communication on the selected uplink channel during the uplink segment of the first frame. For example, the first UE 210-a may transmit an uplink communication on channel B, the second UE 210-b may transmit an uplink communication on channel C, and the third UE 210-c may transmit an uplink communication on channel A.

In some examples, each UE 210 may randomly or pseudo-randomly select a permutation of the first plurality of downlink carriers, and then select the uplink channel based at least in part on the selected permutation. For example, the first plurality of downlink carriers may include three channels A, B, and C. There are six potential permutations of these channels. Each UE 210 may randomly or pseudo-randomly select one of the permutations using a common algorithm, such that each UE 210 selects the same permutation. For example, each UE 210 may select the permutation {B, C, A}. Each UE 210 may then select an uplink channel based on the selected permutation. For example, the first UE 210-a may select channel B, the second UE 210-b may select channel C, and the third UE 210-c may select channel A. The UEs 210 may then transmit an uplink communication on the selected uplink channel during the uplink segment of the first frame. For example, the first UE 210-a may transmit an uplink communication on channel B, the second UE 210-b may transmit an uplink communication on channel C, and the third UE 210-c may transmit an uplink communication on channel A.

In some examples, the UE 210 may randomly or pseudo-randomly select a primary channel as the first uplink channel. For example, the first plurality of downlink carriers may include three channels A, B, and C. Each UE 210 may randomly or pseudo-randomly select a primary channel using a common algorithm, such that each UE 210 selects the same primary channel. For example, each UE 210 may select channel B as the primary channel. The UEs 210 may then transmit an uplink communication on the selected primary channel during the uplink segment of the first frame.

In some examples, one or more of the UEs 210 may select a same uplink channel. The base station 205 may identify an anticipated collision based at least in part on the selection procedure (e.g., the algorithm) used by the UEs 210 to select the uplink channel. The base station 205 may provide TDM information to the UEs 210 in the downlink communication. One or more of the UEs 210 may transmit their uplink communications on the same uplink channel during the uplink segment of the first frame based at least in part on the TDM information. In some examples, two UEs 210 from different carriers may hop on a same hopping frequencies and a scheduler at the base station 205 may carefully TDM uplink transmission(s) on the same hopping frequencies.

In some examples, the first frame may include one or more additional downlink and uplink segments. The base station 205 may transmit additional downlink communications during the additional downlink segments using the assignments determined in the first frequency hopping procedure. The UEs 210 may perform additional frequency hopping procedures for each additional uplink segment to select an uplink channel from the first plurality of downlink carriers. For example, for a second uplink segment in the first frame, the first UE 210-a may perform a third frequency hopping procedure, which may use the same selection procedure (e.g., algorithm) used above for the second frequency hopping procedure. The first UE 210-a may identify channel A as the uplink channel for the second uplink segment based on the third frequency hopping procedure.

At the start of the second frame, the base station 205 may transmit a second reference signal. The base station 205 and the UEs 210 may then perform a third random or pseudo-random frequency hopping procedure to identify a second plurality of downlink carriers for the second frame. The third random or pseudorandom frequency hopping procedure may use the same selection procedure (e.g., algorithm) as the first frequency hopping procedure.

The UEs 210 may perform a fourth random or pseudo-random frequency hopping procedure within the second plurality of downlink carriers to select an uplink carrier for an uplink segment of the second frame. The fourth frequency hopping procedure may use the same selection procedure (e.g., algorithm) used above for the second frequency hopping procedure. The UEs 210 may then transmit uplink communications on the selected uplink carrier during the uplink segment of the second frame.

Figure 3:
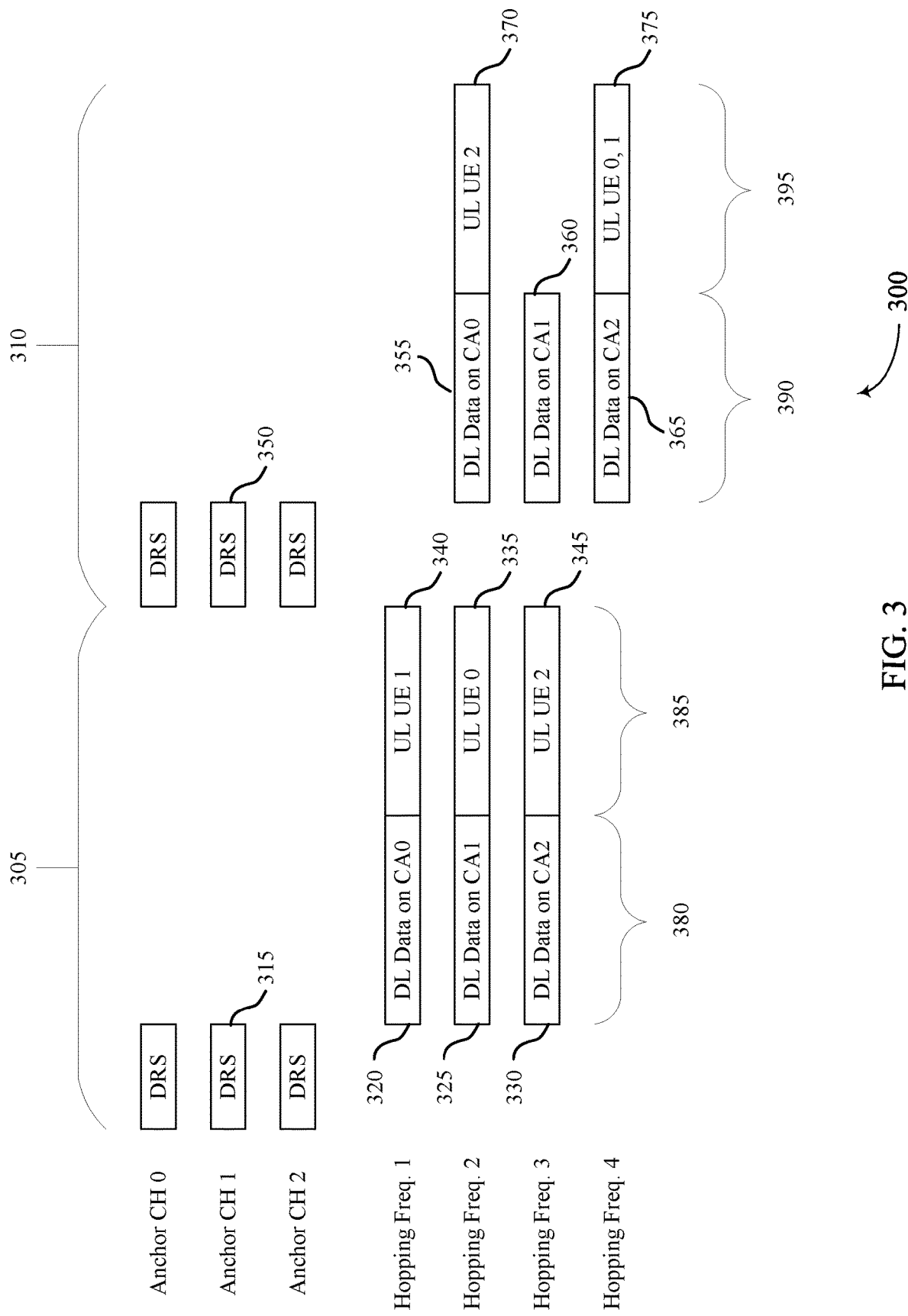
FIG. 3 illustrates an example of a communication sequence in a wireless communication system that supports nested frequency hopping for data transmission in accordance with aspects of the present disclosure.

FIG. 3 illustrates an example of a communication sequence 300 in a wireless communication system that supports nested frequency hopping for data transmission in accordance with various aspects of the present disclosure. In some examples, the wireless communication system may implement aspects of wireless communications system 100.

The communication sequence 300 may show downlink communications from a base station to a plurality of UEs, and uplink communications from the plurality of UEs to the base station. The base station and the UEs may be examples of aspects of base station 105 and UEs 115 as described with reference to FIG. 1. The communication sequence 300 includes a first frame 305 and a second frame 310. Each frame may be, for example, an m-frame. In some examples, each frame may have a standard duration such as 160 milliseconds or 320 milliseconds. The first frame 305 includes a first time period 380 corresponding to a downlink segment and a second time period 385 corresponding to an uplink segment. The second time frame 310 includes a third time period 390 corresponding to a downlink segment and a fourth time period 395 corresponding to an uplink segment.

At the start of the first frame 305, the base station 105 may transmit a discovery reference signal (DRS) 315 on at least one anchor channel. Each anchor channel may correspond to one resource block. The anchor channels may be resource blocks that are designated for transmitting a DRS and that are used exclusively or primarily for the transmission of the DRS and other control signals. The resource blocks used for the anchor channels may be known to the base station 105 and the plurality of UEs 115 before the DRS is transmitted. For example, the base station 105 may identify the anchor channels when a UE 115 joins the cell. In some examples, the DRS may have a standard duration such as 10 milliseconds or 20 milliseconds.

The base station 105 and the UEs 115 may perform a first random or pseudorandom frequency hopping procedure to select and/or identify a first plurality of downlink carriers for downlink segments of the first frame 305. In some examples, the base station 105 and the UEs 115 may select and/or identify the first plurality of downlink carriers based at least in part on a pseudorandom sequence known to both the base station 105 and the UEs 115.

In some examples, the first plurality of downlink carriers may include a set of three or more contiguous data channels (e.g., three or more contiguous channels starting with a first channel corresponding to hopping frequency 1). The first plurality of downlink carriers for the first frame 305 may be, with respect to FIG. 3, a first channel corresponding to hopping frequency 1, a second channel corresponding to hopping frequency 2, and a third channel corresponding to hopping frequency 3. Each downlink carrier may correspond to a resource block.

The base station 105 may transmit downlink data on one or more of the first plurality of downlink carriers during downlink segments of the first frame 305. For example, during the first time period 380, the base station 105 may transmit downlink data 320 for a first UE (UE0) on a first channel corresponding to hopping frequency 1, downlink data 325 for a second UE (UE1) on a second channel corresponding to hopping frequency 2, and downlink data 330 for a third UE (UE2) on a third channel corresponding to hopping frequency 3. The base station 105 may use the same downlink carrier assignments for any additional downlink communications during the first time frame 305.

Each UE 115 may perform a second random or pseudorandom frequency hopping procedure within the first plurality of downlink carriers to select one of the first plurality of downlink channels as an uplink channel for the second time period 385. For example, each UE 115 may randomly or pseudo-randomly select one of the first plurality of downlink carriers as the uplink channel. In some examples, the UE 115 may randomly or pseudo-randomly select one of the first plurality of downlink carriers based at least in part on a random or pseudorandom number generator. In some examples, the UE 115 may select one of the first plurality of downlink carriers based at least in part on a random or pseudorandom pattern. The selection of the uplink channel at one UE (e.g., first UE (UE0)) may be independent of the selection of the uplink channel at other UEs in a cell (e.g., second UE (UE1) and third UE (UE2)).

For example, with reference to FIG. 3, a first UE (UE0) may randomly or pseudo-randomly select a second channel corresponding to hopping frequency 2 as the uplink channel. A second UE (UE1) may select a first channel corresponding to hopping frequency 1 as the uplink channel. A third UE (UE2) may select a third channel corresponding to hopping frequency 3 as the uplink channel. In some examples, a UE 115 may randomly or pseudo-randomly select an uplink channel that is different than the channel on which it received downlink data (e.g., UE0 and UE1). In some examples, a UE 115 may randomly or pseudo-randomly select an uplink channel that is the same as the channel on which it received downlink data (e.g., UE2).

The UEs 115 may transmit uplink communications on the selected uplink channels during the second time period 385. For example, the first UE (UE0) may transmit an uplink communication 335 on the second channel, the second UE (UE1) may transmit an uplink communication 340 on the first channel, and the third UE (UE2) may transmit an uplink communication 345 on the third channel.

At the start of the second frame 310, the base station 105 may transmit a second DRS 350 on the at least one anchor channel, as described above with respect to DRS 315.

The base station 105 and the UEs 115 may perform a third random or pseudorandom frequency hopping procedure to select and/or identify a second plurality of downlink carriers for downlink segments of the second frame 310. The UEs 115 may perform the third random or pseudorandom frequency hopping procedure as described above with respect to the first random or pseudorandom frequency hopping procedure. In some examples, the base station 105 and the UEs 115 may select and/or identify the second plurality of downlink carriers based at least in part on a pseudorandom sequence known to both the base station 105 and the UEs 115. In some examples, the base station 105 and the UEs 115 may select and/or identify the second plurality of downlink carriers based at least in part on the first plurality of downlink carriers, e.g., the second plurality of downlink carriers may include a set of three or more contiguous downlink carriers starting with the second data channel in the first plurality of downlink carriers (e.g., the second channel corresponding to hopping frequency 2). The second plurality of downlink carriers for the second frame 310 may be, with respect to FIG. 3, a second channel corresponding to hopping frequency 2, a third channel corresponding to hopping frequency 3, and a fourth channel corresponding to hopping frequency 4. Each channel may correspond to a resource block.

The base station 105 may transmit downlink data on one or more of the second plurality of downlink carriers. For example, during the third time period 390, the base station 105 may transmit downlink data 355 for a first UE (UE0) on a second channel corresponding to hopping frequency 2, downlink data 360 for a second UE (UE1) on a third channel corresponding to hopping frequency 3, and downlink data 365 for a third UE (UE2) on a fourth channel corresponding to hopping frequency 4. The base station 105 may use the same downlink carrier assignments for any additional downlink communications during the second time frame 310.

Each UE 115 may perform a fourth random or pseudorandom frequency hopping procedure within the second plurality of downlink carriers to select one of the second plurality of downlink channels as a second uplink channel for the fourth time period 395. The UE 115 may perform the fourth random or pseudorandom frequency hopping procedure as described above with respect to the second random or pseudorandom frequency hopping procedure.

In some examples, two or more UEs 115 may select the same downlink carrier as an uplink channel for the fourth time period 395. For example, in the fourth time period 395, the first UE (UE0) and the second UE (UE1) may select the fourth channel as the uplink channel, while the third UE (UE2) may select the second channel as the uplink channel.

The base station 105 may identify an anticipated collision between the first UE (UE0) and the second UE (UE1). For example, the base station 105 may identify an anticipated collision based at least in part on a selection procedure (e.g., a pseudorandom pattern) used by each UE. The base station 105 may provide time division multiplexing information to the first UE (UE0) and the second UE (UE1). In some examples, the base station 105 may transmit the time division multiplexing information in the downlink communications 355, 360, and 365 of third time period 390 (e.g., in a final segment of the downlink communications).

The UEs 115 may transmit uplink communications on the selected uplink channels during the fourth time period 395. For example, the third UE (UE2) may transmit an uplink communication 370 on the second channel. The first UE (UE0) and second UE (UE1) may transmit uplink communications 375 on the fourth channel based at least in part on the time division multiplexing information.

Figure 4:
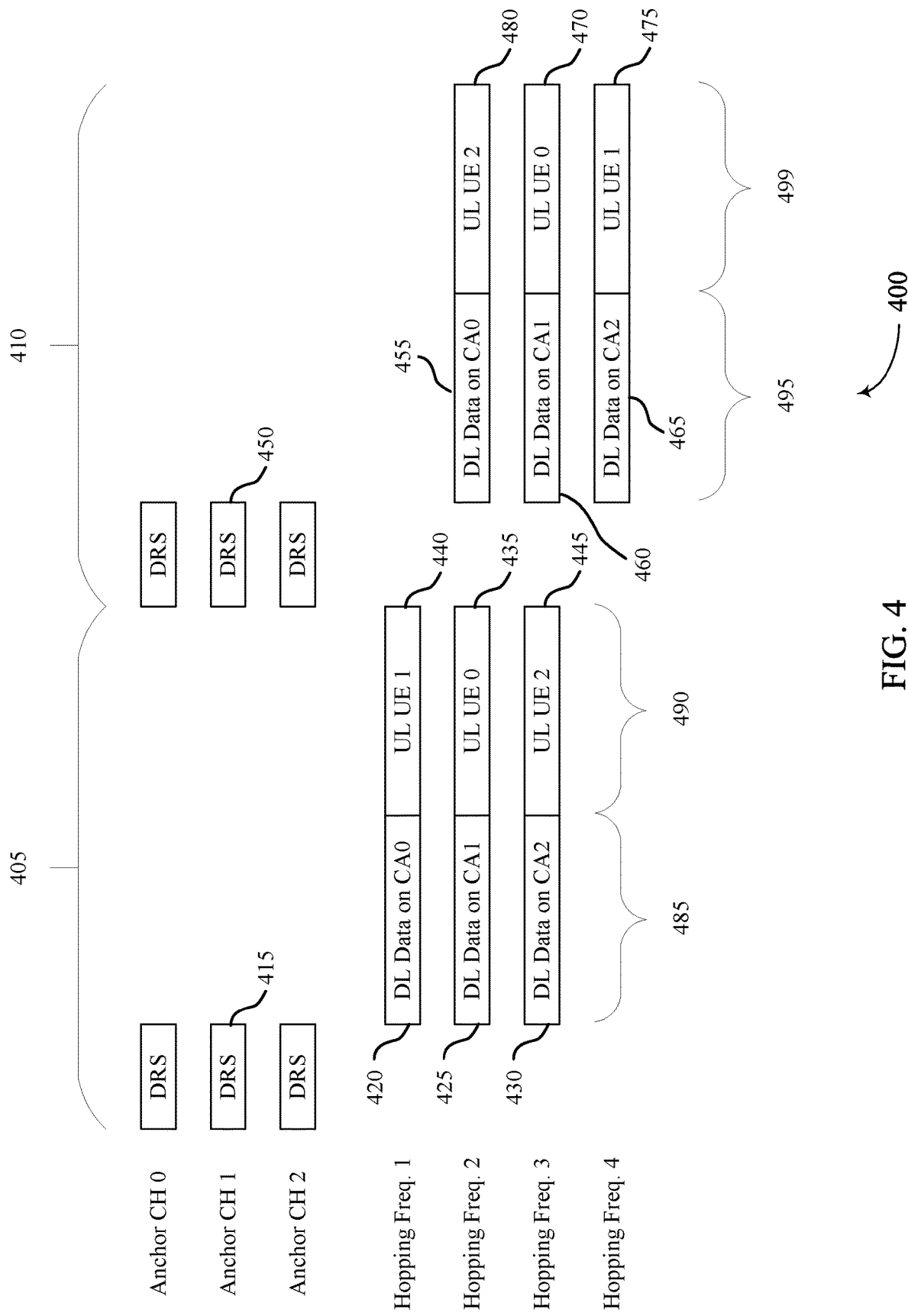
FIG. 4 illustrates an example of a communication sequence in a wireless communication system that supports nested frequency hopping for data transmission in accordance with aspects of the present disclosure.

FIG. 4 illustrates an example of a communication sequence 400 in a wireless communication system that supports nested frequency hopping for data transmission in accordance with various aspects of the present disclosure. In some examples, the wireless communication system may implement aspects of wireless communications system 100.

The communication sequence 400 may show downlink communications from a base station to a plurality of UEs, and uplink communications from the plurality of UEs to the base station. The base station and the UEs may be examples of aspects of base station 105 and UEs 115 as described with reference to FIG. 1. The communication sequence 400 includes a first frame 405 and a second frame 410, which may be examples of aspects of first frame 305 and second frame 310 as described with reference to FIG. 3. The first frame 405 includes a first time period 485 corresponding to a downlink segment and a second time period 490 corresponding to an uplink segment. The second frame 410 includes a third time period 495 corresponding to a downlink segment and a fourth time period 499 corresponding to an uplink segment.

At the start of the first frame 405, the base station 105 may transmit a first DRS 415 on at least one anchor channel, as described above with reference to FIG. 3.

The base station 105 and the plurality of UEs 115 may perform a first random or pseudorandom frequency hopping procedure to select and/or identify a first plurality of downlink carriers for the first frame 405. In some examples, the base station 105 and the UEs 115 may select and/or identify the first plurality of downlink carriers based at least in part on a pseudorandom sequence known to both the base station 105 and the UEs 115. The first plurality of downlink carriers may be, with respect to FIG. 4, a first channel corresponding to hopping frequency 1, a second channel corresponding to hopping frequency 2, and a third channel corresponding to hopping frequency 3.

The base station 105 may transmit downlink data on one or more of the first plurality of data channels during first time period 485. For example, during a first time period corresponding to the downlink segment of the first frame 405, the base station 105 may transmit downlink data 420 for a first UE (UE0) on a first channel corresponding to hopping frequency 1, downlink data 425 for a second UE (UE1) on a second channel corresponding to hopping frequency 2, and downlink data 430 for a third UE (UE2) on a third channel corresponding to hopping frequency 3. The base station 105 may use the same downlink carrier assignments for any additional downlink communications during the first frame 405.

Each UE 115 may perform a second random or pseudorandom frequency hopping procedure within the first plurality of downlink carriers to select one of the first plurality of downlink channels as an uplink channel for a second time period 490. For example, a UE 115 may randomly or pseudo-randomly select a permutation of the first plurality of downlink carriers. For example, for three UEs 115 transmitting over three downlink carriers (as shown in FIG. 4), there may be six possible permutations: {0, 1, 2}, {0, 2, 1}, {1, 0, 2}, {1, 2, 0}, {2, 0, 1}, and {2, 1, 0}. The UE 115 may randomly or pseudo-randomly select one of the six permutations. Each UE 115 may select the permutation using the same selection procedure, such that each UE 115 selects the same permutation. For example, each UE 115 may randomly or pseudo-randomly select the permutation {1, 0, 2}. The UE 115 may select the permutation based at least in part on a random or pseudorandom number generator, a random or pseudorandom pattern, or the like.

The UE 115 may select the uplink channel based at least in part on the selected permutation. For example, based on the permutation {1, 0, 2}, the second UE (UE1) may select a first channel in a contiguous set of channels (corresponding to hopping frequency 1), the first UE (UE0) may select a second channel in the contiguous set of channels (corresponding to hopping frequency 2), and the third UE (UE2) may select a third channel in the contiguous set of channels (corresponding to hopping frequency 3).

The UEs 115 may transmit uplink communications on the selected uplink channels during the second time period 490. For example, the first UE (UE0) may transmit an uplink communication 435 on the second channel, the second UE (UE1) may transmit an uplink communication 440 on the first channel, and the third UE (UE2) may transmit an uplink communication 445 on the third channel.

At the start of the second frame 410, the base station 105 may transmit a second DRS 450 on the at least one anchor channel, as described above with respect to DRS 415.

The base station 105 and the UEs 115 may perform a third random or pseudorandom frequency hopping procedure to select and/or identify a second plurality of downlink carriers for downlink segments of the second frame 410. The UEs 115 may perform the third random or pseudorandom frequency hopping procedure as described above with respect to the first random or pseudorandom frequency hopping procedure. In some examples, the base station 105 and the UEs 115 may select and/or identify the second plurality of downlink carriers based at least in part on a pseudorandom sequence known to both the base station 105 and the UEs 115. In some examples, the base station 105 and the UEs 115 may select and/or identify the second plurality of downlink carriers based at least in part on the first plurality of downlink carriers, e.g., the second plurality of downlink carriers may include a set of three or more contiguous downlink carriers starting with the second data channel in the first plurality of downlink carriers (e.g., the second channel corresponding to hopping frequency 2). The second plurality of downlink carriers for the second frame 410 may be, with respect to FIG. 4, a second channel corresponding to hopping frequency 2, a third channel corresponding to hopping frequency 3, and a fourth channel corresponding to hopping frequency 4. Each channel may correspond to a resource block.

The base station 105 may transmit downlink data on one or more of the second plurality of downlink carriers. For example, during a third time period 495, the base station 105 may transmit downlink data 455 for a first UE (UE0) on a second channel corresponding to hopping frequency 2, downlink data 460 for a second UE (UE1) on a third channel corresponding to hopping frequency 3, and downlink data 465 for a third UE (UE2) on a fourth channel corresponding to hopping frequency 4. The base station 105 may use the same downlink carrier assignments for any additional downlink communications during the second frame 410.

Each UE 115 may perform a fourth random or pseudorandom frequency hopping procedure within the second plurality of downlink carriers to select one of the second plurality of downlink channels as a second uplink channel for a fourth time period 499. The UE 115 may perform the fourth random or pseudorandom frequency hopping procedure as described above with respect to the second random or pseudorandom frequency hopping procedure. In contrast to the selection scheme described with reference to FIG. 3, the random or pseudorandom selection of a permutation of the downlink carriers may avoid collisions, and as such no time division multiplexing information may be transmitted.

The UEs 115 may select a second permutation of the second plurality of downlink, e.g., {2, 0, 1}. The UEs 115 may select a second uplink channel based at least in part on the second permutation. For example, based on the permutation {2, 0, 1}, the third UE (UE2) may select a first channel in a contiguous set of channels (corresponding to hopping frequency 2), the first UE (UE0) may select a second channel in the contiguous set of channels (corresponding to hopping frequency 3), and the second UE (UE1) may select a third channel in the contiguous set of channels (corresponding to hopping frequency 4). The UEs 115 may transmit uplink communications on the selected uplink channels during the fourth time period 499. For example, the first UE (UE0) may transmit an uplink communication 470 on the channel corresponding to hopping frequency 3, the second UE (UE1) may transmit an uplink communication 475 on the channel corresponding to hopping frequency 4, and the third UE (UE2) may transmit an uplink communication 480 on the channel corresponding to hopping frequency 2.

Figure 5:
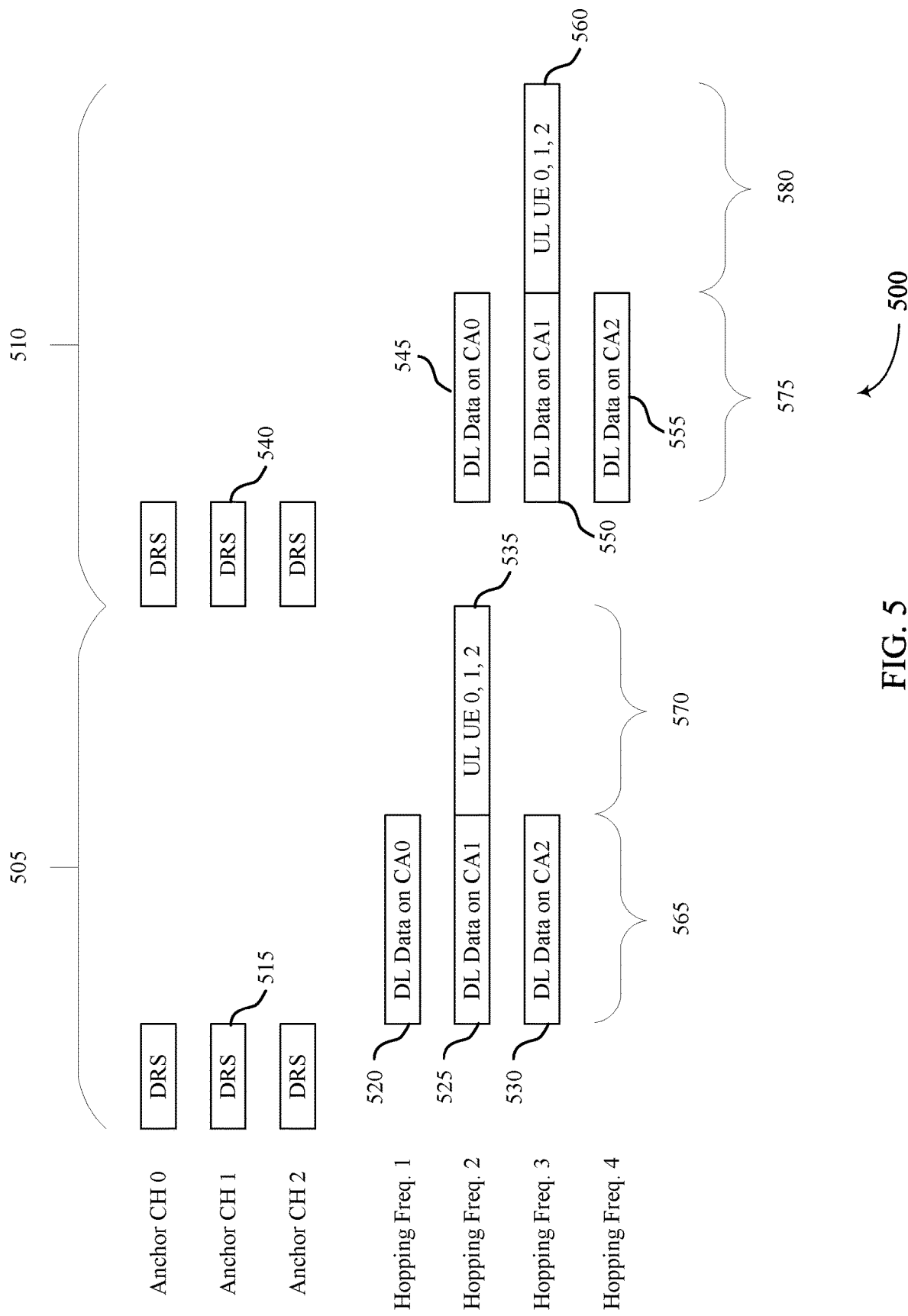
FIG. 5 illustrates an example of a communication sequence in a wireless communication system that supports nested frequency hopping for data transmission in accordance with aspects of the present disclosure.

FIG. 5 illustrates an example of a communication sequence 500 in a wireless communication system that supports nested frequency hopping for data transmission in accordance with various aspects of the present disclosure. In some examples, the wireless communication system may implement aspects of wireless communications system 100.

The communication sequence 500 may show downlink communications from a base station to a plurality of UEs, and uplink communications from the plurality of UEs to the base station. The base station and the UEs may be examples of aspects of base station 105 and UEs 115 as described with reference to FIG. 1. The communication sequence 500 includes a first frame 505 and a second frame 510, which may be examples of aspects of first frame 305 and second frame 310 as described with reference to FIG. 3. The first frame 505 includes a first time period 565 corresponding to a downlink segment and a second time period 570 corresponding to an uplink segment. The second frame 510 includes a third time period 575 corresponding to a downlink segment and a fourth time period 580 corresponding to an uplink segment.

At the start of the first frame 505, the base station 105 may transmit a first DRS 515 on at least one anchor channel, as described above with reference to FIG. 3. For example, the base station 205 may transmit a DRS on at least three anchor channels or carriers simultaneously.

The base station 105 and the plurality of UEs 115 may perform a first random or pseudorandom frequency hopping procedure to select and/or identify a first plurality of downlink carriers for the first frame 505. In some examples, the base station 105 and the UEs 115 may select and/or identify the first plurality of downlink carriers based at least in part on a pseudorandom sequence known to both the base station 105 and the UEs 115. The first plurality of downlink carriers may be, with respect to FIG. 5, a first channel corresponding to hopping frequency 1, a second channel corresponding to hopping frequency 2, and a third channel corresponding to hopping frequency 3.

The base station 105 may transmit downlink data on one or more of the first plurality of data channels during downlink segments of the first frame 505. For example, during the first time period 565, the base station 105 may transmit downlink data 520 for a first UE (UE0) on a first channel corresponding to hopping frequency 1, downlink data 525 for a second UE (UE1) on a second channel corresponding to hopping frequency 2, and downlink data 530 for a third UE (UE2) on a third channel corresponding to hopping frequency 3. The base station 105 may use the same downlink carrier assignments for any additional downlink communications during the first frame 505.

Each UE 115 may perform a second random or pseudorandom frequency hopping procedure within the first plurality of downlink carriers to select one of the first plurality of downlink channels as an uplink channel for the second time period 570. For example, a UE 115 may randomly or pseudo-randomly select a primary channel from the first plurality of downlink carriers. In some examples, the UE 115 may randomly or pseudo-randomly select one of the first plurality of downlink carriers based at least in part on a random or pseudorandom number generator. In some examples, the UE 115 may select one of the first plurality of downlink carriers based at least in part on a random or pseudorandom pattern. The primary channel is a channel which will be used for uplink communications by all UEs 115 in the cell during the time period (e.g., during second time period 570). In some examples, each UE 115 may independently identify and/or select the primary channel. In some other examples, one UE 115 may identify and/or select the primary channel and communicate an indication of the primary channel to the other UEs 115 in the cell.

For example, each UE 115 may randomly or pseudo-randomly select a second channel corresponding to hopping frequency 2 as the uplink channel. The UEs 115 may transmit uplink communications 535 on the primary channel during the second time period 570. The UEs 115 may transmit the uplink communications based at least in part on time division multiplexing information. In some examples, the base station 105 may transmit time division multiplexing information to the UEs 115, e.g., in the downlink data 520, 525, and 530 during the first time period 565 (e.g., in a final segment of the downlink communications).

At the start of the second frame 510, the base station 105 may transmit a second DRS 540 on the at least one anchor channel, as described above with respect to DRS 515.

The base station 105 and the UEs 115 may perform a third random or pseudorandom frequency hopping procedure to select and/or identify a second plurality of downlink carriers for downlink segments of the second frame 510. The UEs 115 may perform the third random or pseudorandom frequency hopping procedure as described above with respect to the first random or pseudorandom frequency hopping procedure. In some examples, the base station 105 and the UEs 115 may select and/or identify the second plurality of downlink carriers based at least in part on a pseudorandom sequence known to both the base station 105 and the UEs 115. In some examples, the base station 105 and the UEs 115 may select and/or identify the second plurality of downlink carriers based at least in part on the first plurality of downlink carriers, e.g., the second plurality of downlink carriers may include a set of three or more contiguous downlink carriers starting with the second data channel in the first plurality of downlink carriers (e.g., the second channel corresponding to hopping frequency 2). The second plurality of downlink carriers for the second frame 510 may be, with respect to FIG. 5, a second channel corresponding to hopping frequency 2, a third channel corresponding to hopping frequency 3, and a fourth channel corresponding to hopping frequency 4. Each channel may correspond to a resource block.

The base station 105 may transmit downlink data on one or more of the second plurality of downlink carriers. For example, during the third time period 575, the base station 105 may transmit downlink data 545 for a first UE (UE0) on a second channel corresponding to hopping frequency 2, downlink data 550 for a second UE (UE1) on a third channel corresponding to hopping frequency 3, and downlink data 555 for a third UE (UE2) on a fourth channel corresponding to hopping frequency 4. The base station 105 may use the same downlink carrier assignments for any additional downlink communications during the second frame 510.

Each UE 115 may perform a fourth random or pseudorandom frequency hopping procedure within the second plurality of downlink carriers to select one of the second plurality of downlink channels as a second uplink channel for the fourth time period 580. The UE 115 may perform the fourth random or pseudorandom frequency hopping procedure as described above with respect to the second random or pseudorandom frequency hopping procedure.

For example, each UE 115 may randomly or pseudo-randomly select a third channel corresponding to hopping frequency 3 as the uplink channel. The UEs 115 may transmit uplink communications 560 on the primary channel during the fourth time period 580. The UEs 115 may transmit the uplink communications based at least in part on second time division multiplexing information. In some examples, the base station 105 may transmit second time division multiplexing information to the UEs 115, e.g., in the downlink data 545, 550, and 555 during the third time period 575 (e.g., in a final segment of the downlink communications).

Figure 6:
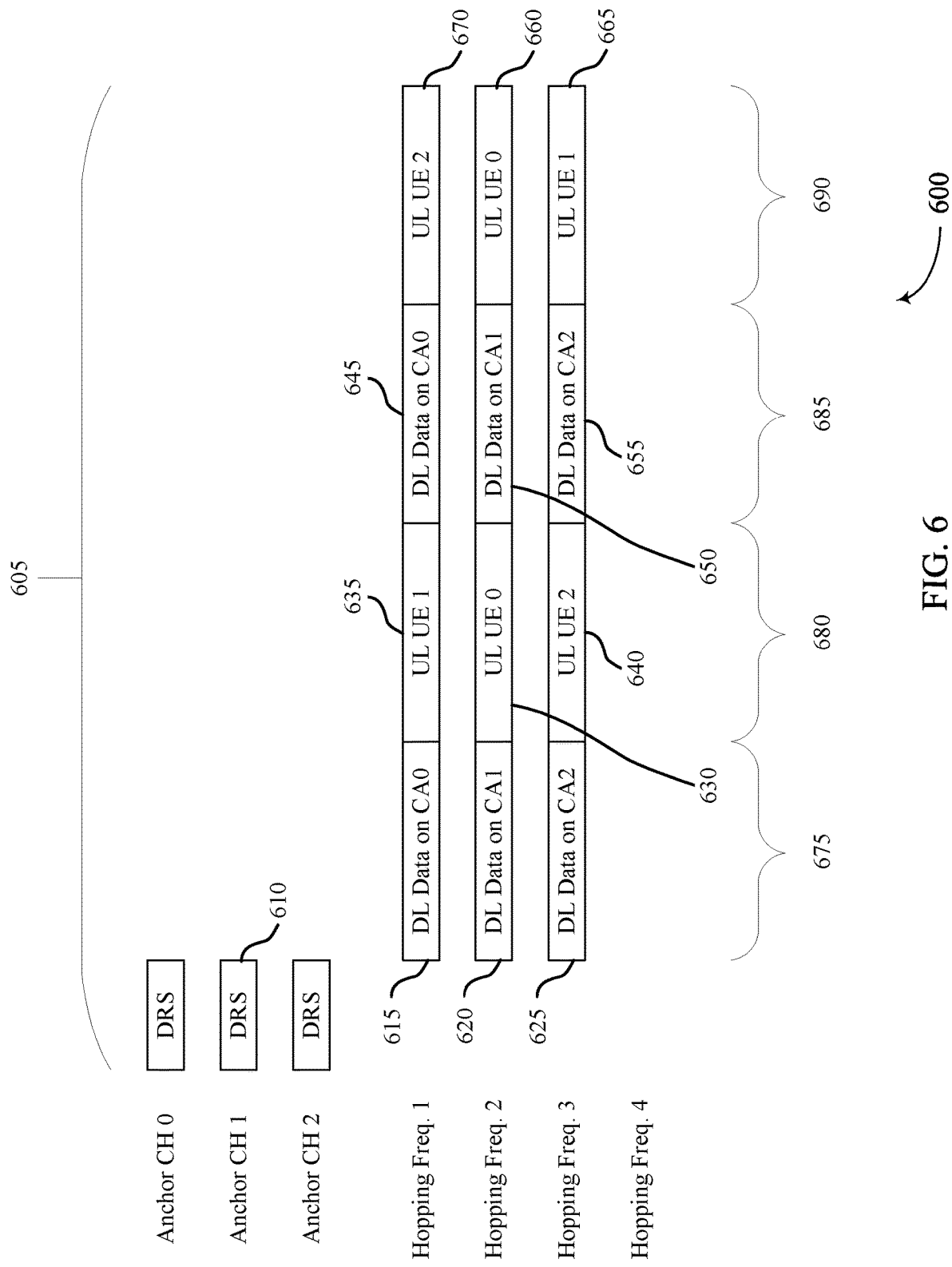
FIG. 6 illustrates an example of a communication sequence in a wireless communication system that supports nested frequency hopping for data transmission in accordance with aspects of the present disclosure.

FIG. 6 illustrates an example of a communication sequence 600 in a wireless communication system that supports nested frequency hopping for data transmission in accordance with various aspects of the present disclosure. In some examples, the wireless communication system may implement aspects of wireless communications system 100.

The communication sequence 600 may show downlink communications from a base station to a plurality of UEs, and uplink communications from the plurality of UEs to the base station. The base station and the UEs may be examples of aspects of base station 105 and UEs 115 as described with reference to FIG. 1. The communication sequence 600 includes a first frame 605. Each frame may be, for example, an m-frame. In some examples, each frame may have a standard duration such as 160 milliseconds or 320 milliseconds. The first frame 605 may include a first time period 675 corresponding to a first downlink segment, a second time period 680 corresponding to a first uplink segment, a third time period 685 corresponding to a second downlink segment, and a fourth time period 690 corresponding to a second uplink segment. In such cases, random hopping frequencies for multiple uplink segments of a UE 115 may be on different hopping frequencies within the same m-frame, thereby alleviating frequency collision(s).

At the start of the first frame 605, the base station 105 may transmit a first DRS 610 on at least one anchor channel, as described above with reference to FIG. 3.

The base station 105 and the plurality of UEs 115 may perform a first random or pseudorandom frequency hopping procedure to select and/or identify a first plurality of downlink carriers for the first frame 605. In some examples, the base station 105 and the UEs 115 may select and/or identify the first plurality of downlink carriers based at least in part on a pseudorandom sequence known to both the base station 105 and the UEs 115. The first plurality of downlink carriers may be, with respect to FIG. 6, a first channel corresponding to hopping frequency 1, a second channel corresponding to hopping frequency 2, and a third channel corresponding to hopping frequency 3.

The base station 105 may transmit downlink data on one or more of the first plurality of data channels during the first time period 675. For example, during the first time period 675, the base station 105 may transmit downlink data 615 for a first UE (UE0) on a first channel corresponding to hopping frequency 1, downlink data 620 for a second UE (UE1) on a second channel corresponding to hopping frequency 2, and downlink data 625 for a third UE (UE2) on a third channel corresponding to hopping frequency 3.

Each UE 115 may perform a second random or pseudorandom frequency hopping procedure within the first plurality of downlink carriers to select one of the first plurality of downlink channels as a first uplink channel for the second time period 680. In some examples, the UE 115 may randomly or pseudo-randomly select the uplink channel from the first plurality of downlink carriers, as described above with respect to FIG. 3. In some examples, the UE 115 may randomly or pseudo-randomly select a permutation of the first plurality of downlink carriers, and then select the first uplink channel based at least in part on the selected permutation, as described above with respect to FIG. 4. In some examples, the UE 115 may randomly or pseudo-randomly select a primary channel as the first uplink channel, as described above with respect to FIG. 5.

For example, with reference to FIG. 6, a first UE (UE0) may randomly or pseudo-randomly select a second channel corresponding to hopping frequency 2 as the first uplink channel. A second UE (UE1) may select a first channel corresponding to hopping frequency 1 as the first uplink channel. A third UE (UE2) may select a third channel corresponding to hopping frequency 3 as the first uplink channel.

The UEs 115 may transmit first uplink communications on the selected first uplink channels during the second time period 680. For example, the first UE (UE0) may transmit a first uplink communication 630 on the second channel, the second UE (UE1) may transmit a first uplink communication 635 on the first channel, and the third UE (UE2) may transmit a first uplink communication 640 on the third channel.

The base station 105 may transmit second downlink data on one or more of the first plurality of data channels during the third time period 685. The base station 105 may transmit the second downlink data based on the downlink carriers identified and/or selected based on the first random or pseudorandom frequency hopping procedure. For example, during the third time period, the base station 105 may transmit second downlink data 645 for a first UE (UE0) on the first channel corresponding to hopping frequency 1, second downlink data 650 for a second UE (UE1) on the second channel corresponding to hopping frequency 2, and second downlink data 655 for the third UE (UE2) on a third channel corresponding to hopping frequency 3.

Each UE 115 may perform a third random or pseudorandom frequency hopping procedure within the first plurality of downlink carriers to select one of the first plurality of downlink channels as a second uplink channel for the fourth time period 690. In some examples, the UE 115 may randomly or pseudo-randomly select the second uplink channel from the first plurality of downlink carriers, as described above with respect to FIG. 3. In some examples, the UE 115 may randomly or pseudo-randomly select a second permutation of the first plurality of downlink carriers, and then select the second uplink channel based at least in part on the selected second permutation, as described above with respect to FIG. 4. In some examples, the UE 115 may randomly or pseudo-randomly select a second primary channel as the second uplink channel, as described above with respect to FIG. 5. The UE 115 may perform the third random or pseudorandom frequency hopping procedure using the same algorithm as the UE 115 used to perform the second random or pseudorandom frequency hopping procedure.

For example, with reference to FIG. 6, a first UE (UE0) may randomly or pseudo-randomly select the second channel corresponding to hopping frequency 2 as the second uplink channel. A second UE (UE1) may select the third channel corresponding to hopping frequency 3 as the second uplink channel. A third UE (UE2) may select a first channel corresponding to hopping frequency 1 as the second uplink channel.

The UEs 115 may transmit second uplink communications on the selected second uplink channels during the fourth time period 690. For example, the first UE (UE0) may transmit a second uplink communication 660 on the second channel, the second UE (UE1) may transmit a second uplink communication 665 on the third channel, and the third UE (UE2) may transmit a second uplink communication 670 on the first channel.

Figure 7:
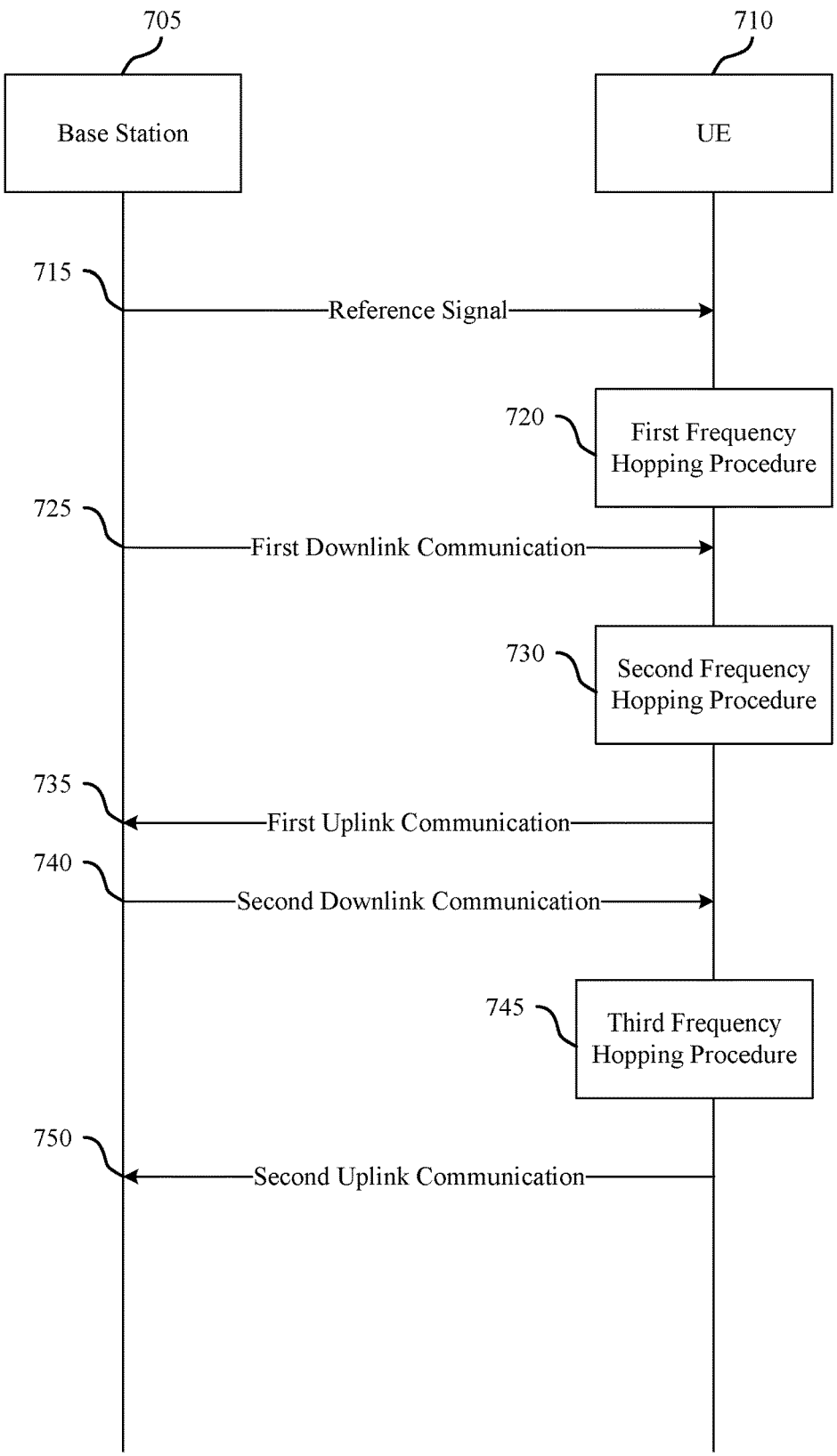
FIG. 7 illustrates an example of a communication flow in a wireless communication system that supports nested frequency hopping for data transmission in accordance with aspects of the present disclosure.

FIG. 7 illustrates an example of a communication flow 700 in a wireless communication system that supports nested frequency hopping for data transmission in accordance with various aspects of the present disclosure. In some examples, the wireless communication system may implement aspects of wireless communications system 100.

The communication flow 700 illustrates downlink communications from a base station 705 to a UE 710 and uplink communications from the UE 710 to the base station 705. The base station 705 and the UE 710 may be examples of aspects of base station 105 and UE 115 as described with reference to FIG. 1. The communication flow 700 may illustrate communications within a first frame (e.g., an m-frame). The first frame may include a first time period corresponding to a first downlink segment, a second time period corresponding to a first uplink segment, a third time period corresponding to a second downlink segment, and a fourth time period corresponding to a second uplink segment.

The base station 705 transmits a reference signal 715 to the UE 710. The reference signal 715 may be a DRS. The reference signal 715 may be transmitted on at least one anchor channel.

The UE 710 may perform a first frequency hopping procedure 720. The first frequency hopping procedure 720 may be a random or pseudorandom frequency hopping procedure. The UE 710 may identify a plurality of downlink carriers for the first frame (e.g., for time periods corresponding to the downlink segments of the first frame) using the first frequency hopping procedure 720. The base station 705 may transmit a first downlink communication 725 to the UE 710 on one of the plurality of downlink carriers during the first time period of the first frame. The first downlink communication 725 may include TDM information for the second time period.

The UE 710 may perform a second frequency hopping procedure 730. The second frequency hopping procedure 730 may be a random or pseudorandom frequency hopping procedure and may be performed within the plurality of downlink carriers. The UE 710 may select one of the plurality of downlink carriers as a first uplink channel for the time period based at least in part on the second frequency hopping procedure 730.

In some examples, the second frequency hopping procedure 730 may include randomly or pseudo-randomly selecting one of the plurality of downlink carriers as the first uplink channel. In some examples, the second frequency hopping procedure 730 may include randomly or pseudo-randomly selecting a permutation of the plurality of downlink carriers, and selecting the first uplink channel based at least in part on the selected permutation. In some examples, the second frequency hopping procedure 730 may include randomly or pseudo-randomly selecting a primary channel as the first uplink channel. In some examples, the UE 710 may select the first uplink channel from the plurality of downlink carriers based at least in part on a random or pseudorandom number generator, a random or pseudorandom pattern, or the like.

The UE 710 may transmit a first uplink communication 735 to the base station 705 during the second time period. In some examples, e.g., when another UE in the cell has selected the same first uplink channel, the UE 710 may transmit the first uplink communication 735 based at least in part on the time division multiplexing information from the first downlink communication 725.

The base station 705 may transmit a second downlink communication 740 to the UE 710 on one of the plurality of downlink carriers during the third time period. The base station 705 may use the same assignments used for the first time period, such that the second downlink communication 740 is received on the same channel as the first downlink communication 725. The second downlink communication 740 may include TDM information for the fourth time period.

The UE 710 may perform a third frequency hopping procedure 745. The third frequency hopping procedure 745 may be a random or pseudorandom frequency hopping procedure and may be performed within the plurality of downlink carriers. The UE 710 may select one of the plurality of downlink carriers as a second uplink channel for the fourth time period using the third frequency hopping procedure 745. The third frequency hopping procedure 745 may be the same selection procedure as the second frequency hopping procedure 730.

The UE 710 may transmit a second uplink communication 750 to the base station 705. The UE 710 may transmit the second uplink communication 750 on the selected second uplink channel during the fourth time period. In some examples, e.g., when another UE in the cell has selected the same second uplink channel, the UE 710 may transmit the second uplink communication 750 based at least in part on time division multiplexing information included in the second downlink communication 740.

In some examples, the first frame may include additional uplink segments. In such examples, the UE 710 may perform a new frequency hopping procedure for each of the additional uplink segments, as described above with respect to third frequency hopping procedure 745.

Figure 8:
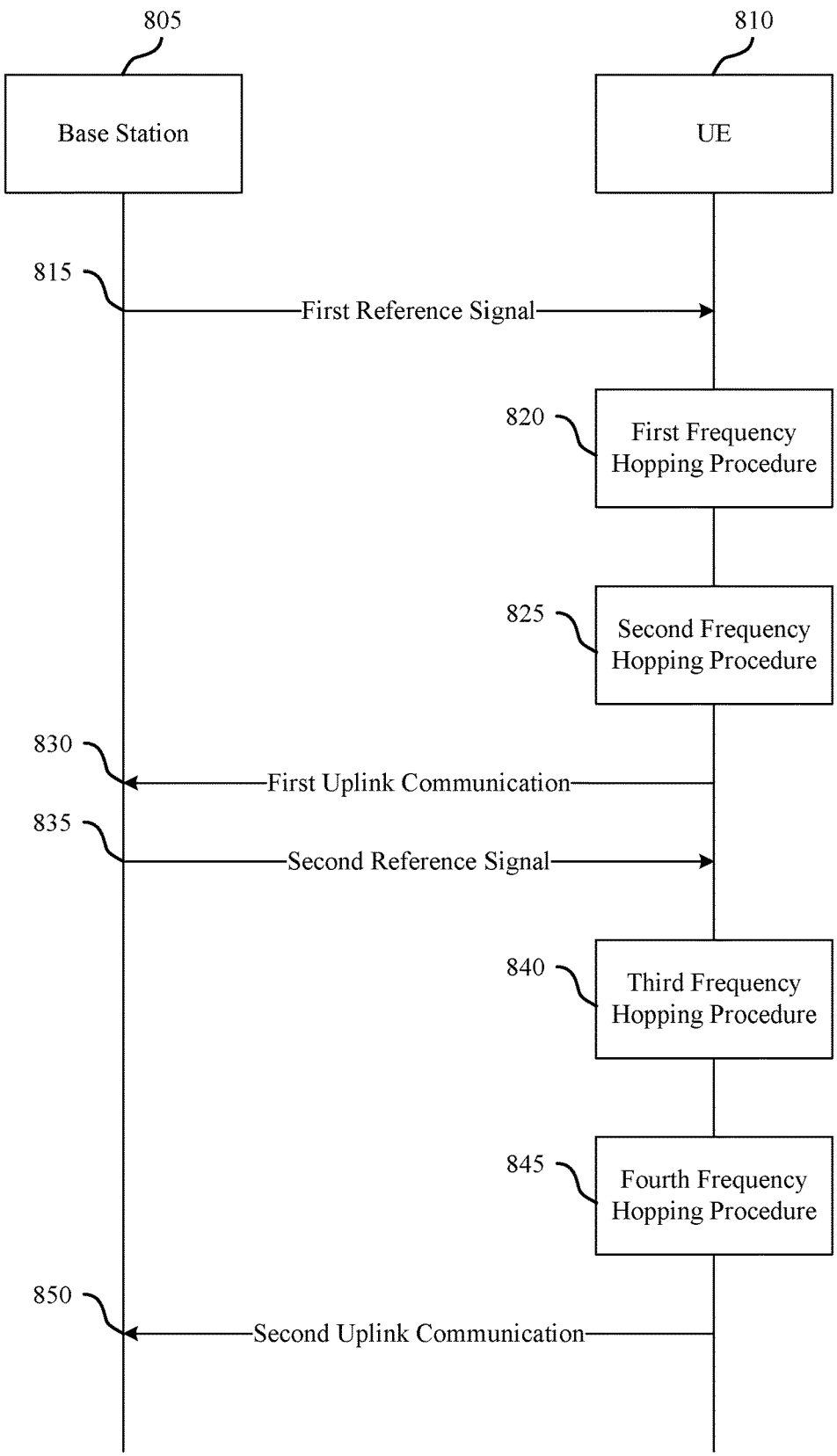
FIG. 8 illustrates an example of a communication flow in a wireless communication system that supports nested frequency hopping for data transmission in accordance with aspects of the present disclosure.

FIG. 8 illustrates an example of a communication flow 800 in a wireless communication system that supports nested frequency hopping for data transmission in accordance with various aspects of the present disclosure. In some examples, the wireless communication system may implement aspects of wireless communications system 100.

The communication flow 800 illustrates communications downlink communications from a base station 805 to a UE 810 and uplink communications from the UE 810 to the base station 805. The base station 805 and the UE 810 may be examples of aspects of base station 105 and UE 115 as described with reference to FIG. 1. The communication flow 800 may illustrate communications over two frames (e.g., two m-frames). The first frame may include a first time period corresponding to a downlink segment and a second time period corresponding to an uplink segment. The second frame may include a third time period corresponding to a downlink segment and a fourth time period corresponding to an uplink segment.

The base station 805 transmits a first reference signal 815 to the UE 810. The first reference signal 815 may be a DRS. The first reference signal 815 may be transmitted on at least one anchor channel.

The UE 810 may perform a first frequency hopping procedure 820. The first frequency hopping procedure 820 may be a random or pseudorandom frequency hopping procedure. The UE 810 may identify a first plurality of downlink carriers for the first frame (e.g., for time periods corresponding to a downlink segment of the first frame) using the first frequency hopping procedure 820. The base station 805 may transmit a first downlink communication to the UE 810 on one of the first plurality of downlink carriers during the first time period. In some examples, the first downlink communication may include TDM information for the second time period.

The UE 810 may perform a second frequency hopping procedure 825. The second frequency hopping procedure 825 may be a random or pseudorandom frequency hopping procedure and may be performed within the first plurality of downlink carriers. The UE 810 may select one of the first plurality of downlink carriers as a first uplink channel for the second time period using the second frequency hopping procedure 825.

In some examples, the second frequency hopping procedure 825 may include randomly or pseudo-randomly selecting one of the first plurality of downlink carriers as the first uplink channel. In some examples, the second frequency hopping procedure 825 may include randomly or pseudo-randomly selecting a permutation of the first plurality of downlink carriers, and selecting the first uplink channel based at least in part on the selected permutation. In some examples, the second frequency hopping procedure 825 may include randomly or pseudo-randomly selecting a primary channel as the first uplink channel. In some examples, the UE 810 may select the first uplink channel from the first plurality of downlink carriers based at least in part on a random or pseudorandom number generator, a random or pseudorandom pattern, or the like.

The UE 810 may transmit a first uplink communication 830 to the base station 805. The UE 810 may transmit the first uplink communication 830 on the selected first uplink channel during the second time period. In some examples, e.g., when another UE in the cell has selected the same first uplink channel, the UE 810 may transmit the first uplink communication 830 based at least in part on time division multiplexing information included in the first time period.

At the start of the second frame, the base station 805 may transmit a second reference signal 835 to the UE 810. The second reference signal 835 may be a DRS. The second reference signal 835 may be transmitted on the at least one anchor channel.

The UE 810 may perform a third frequency hopping procedure 840. The third frequency hopping procedure 840 may be a random or pseudorandom frequency hopping procedure. The UE 810 may identify a second plurality of downlink carriers for the second frame (e.g., for time periods corresponding to a downlink segment of the second frame) using the third frequency hopping procedure 840. The base station 805 may transmit a second downlink communication to the UE 810 on one of the second plurality of downlink carriers during the third time period. In some examples, the second downlink communication may include TDM information for the fourth time period.

The UE 810 may perform a fourth frequency hopping procedure 845. The fourth frequency hopping procedure 845 may be a random or pseudorandom frequency hopping procedure and may be performed within the second plurality of downlink carriers. The UE 810 may select one of the second plurality of downlink carriers as a second uplink channel for the fourth time period using the fourth frequency hopping procedure 845. The fourth frequency hopping procedure 845 may be the same selection procedure as the second frequency hopping procedure 825.

The UE 810 may transmit a second uplink communication 850 to the base station 805. The UE 810 may transmit the second uplink communication 850 on the selected second uplink channel during the fourth time period. In some examples, e.g., when another UE in the cell has selected the same second uplink channel, the UE 810 may transmit the second uplink communication 850 based at least in part on time division multiplexing information included in the second downlink communication.

Figure 9:
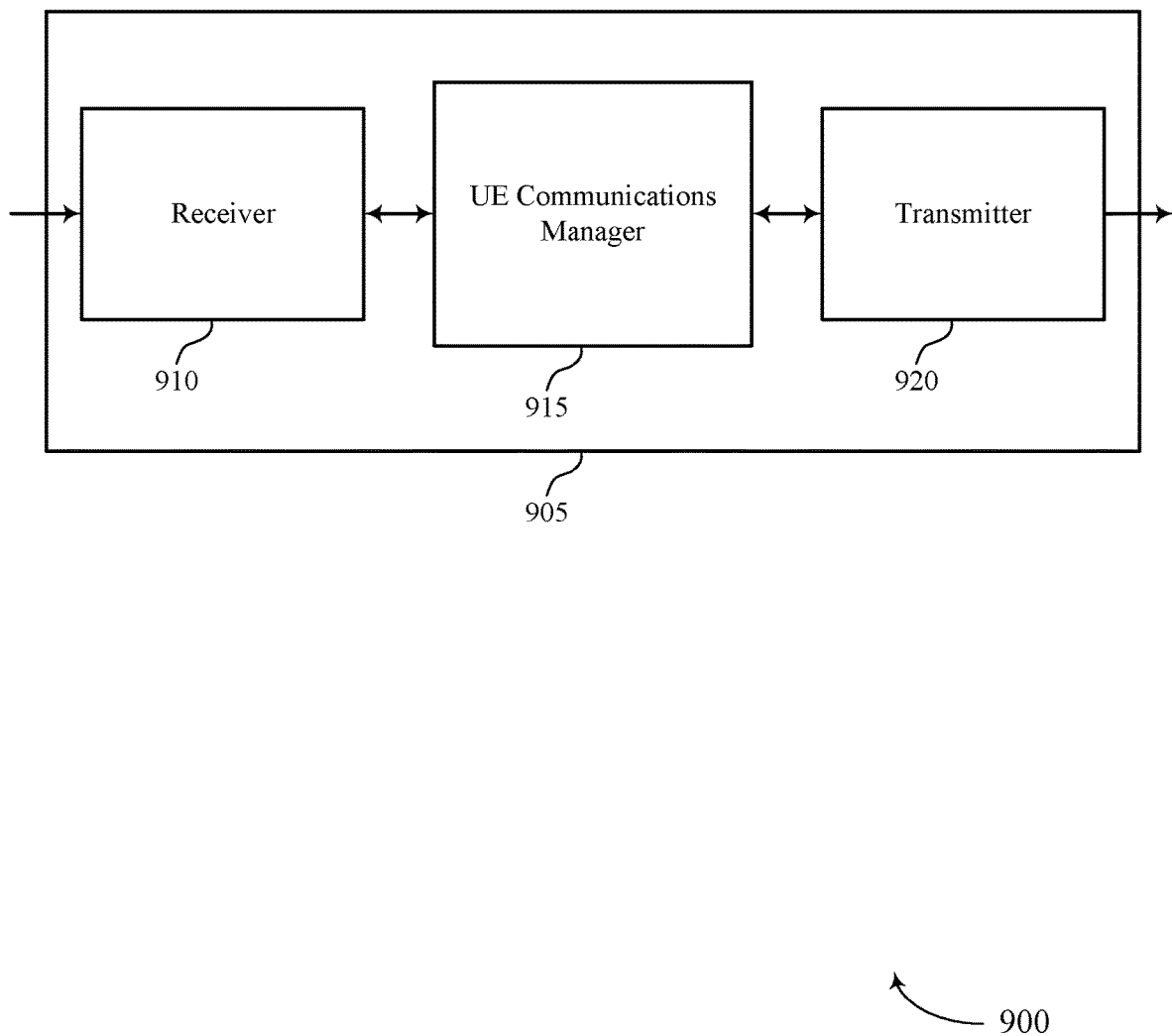
FIGS. 9 through 11 show block diagrams of a device that supports nested frequency hopping for data transmission in accordance with aspects of the present disclosure.

FIG. 9 shows a block diagram 900 of a wireless device 905 that supports nested frequency hopping for data transmission in accordance with aspects of the present disclosure. Wireless device 905 may be an example of aspects of a user equipment (UE) 115 as described herein. Wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to nested frequency hopping for data transmission, etc.). Information may be passed on to other components of the device 905. The receiver 910 may be an example of aspects of the transceiver 1235 described with reference to FIG. 12. The receiver 910 may utilize a single antenna or a set of antennas.

UE communications manager 915 may be an example of aspects of the UE communications manager 1215 described with reference to FIG. 12.

UE communications manager 915 and/or at least some of its various sub-components may be implemented in hardware, software executed by a processor, firmware, or any combination thereof. If implemented in software executed by a processor, the functions of the UE communications manager 915 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The UE communications manager 915 and/or at least some of its various sub-components may be physically located at various positions, including being distributed such that portions of functions are implemented at different physical locations by one or more physical devices. In some examples, UE communications manager 915 and/or at least some of its various sub-components may be a separate and distinct component in accordance with various aspects of the present disclosure. In other examples, UE communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 915 may receive, by a wireless device, a discovery reference signal on at least one anchor carrier, perform a first random or pseudorandom frequency hopping procedure to identify a set of downlink carriers for a first time period, perform a second random or pseudorandom frequency hopping procedure within the set of downlink carriers to select one of the set of downlink channels as an uplink channel for a second time period, and transmit an uplink communication on the selected uplink channel during the second time period.

Transmitter 920 may transmit signals generated by other components of the device 905. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
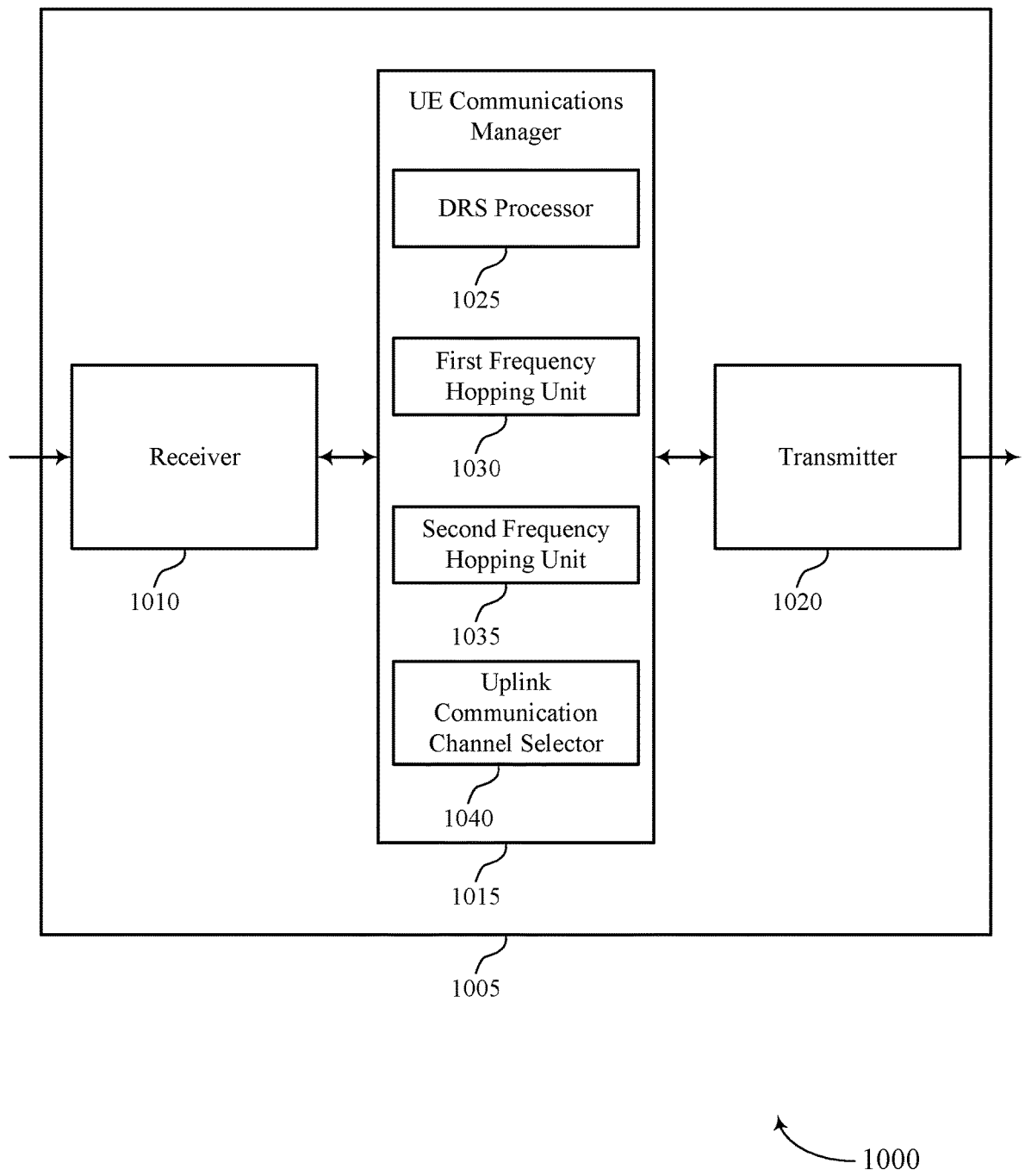

FIG. 10 shows a block diagram 1000 of a wireless device 1005 that supports nested frequency hopping for data transmission in accordance with aspects of the present disclosure. Wireless device 1005 may be an example of aspects of a wireless device 905 or a UE 115 as described with reference to FIG. 9. Wireless device 1005 may include receiver 1010, UE communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to nested frequency hopping for data transmission, etc.). Information may be passed on to other components of the device 1005. The receiver 1010 may be an example of aspects of the transceiver 1235 described with reference to FIG. 12. The receiver 1010 may utilize a single antenna or a set of antennas.

UE communications manager 1015 may be an example of aspects of the UE communications manager 1215 described with reference to FIG. 12.

UE communications manager 1015 may also include DRS processor 1025, first frequency hopping unit 1030, second frequency hopping unit 1035, and uplink communication channel selector 1040.

DRS processor 1025 may receive, by a wireless device, a discovery reference signal on at least one anchor carrier and receive, by the wireless device, a second discovery reference signal on the at least one anchor channel.

First frequency hopping unit 1030 may perform a first random or pseudorandom frequency hopping procedure to identify a set of downlink carriers for a first time period and perform a third random or pseudorandom frequency hopping procedure to identify a second set of downlink carriers for a third time period. In some cases, each of the set of downlink carriers includes a resource block.

Second frequency hopping unit 1035 may perform a second random or pseudorandom frequency hopping procedure within the set of downlink carriers to select one of the set of downlink channels as an uplink channel for a second time period, receive a downlink communication for the wireless device on a downlink channel of the set of downlink carriers, where the uplink channel is different than the downlink channel, select the uplink channel based on the permutation, perform a third random or pseudorandom frequency hopping procedure within the set of downlink carriers to select a second one of the set of downlink channels as a second uplink channel for a third time period, and perform a fourth random or pseudorandom frequency hopping procedure within the set of downlink carriers to select one of the second set of downlink channels as a second uplink channel for a fourth time period. In some cases, performing the second random or pseudo-random frequency hopping procedure within the set of downlink carriers includes: randomly or pseudo-randomly selecting the one of the set of downlink channels. In some cases, performing the second random or pseudo-random frequency hopping procedure within the set of downlink carriers includes: randomly or pseudo-randomly selecting a permutation of the set of downlink carriers. In some cases, performing the second random or pseudo-random frequency hopping within the set of downlink carriers includes: randomly or pseudo-randomly selecting a primary channel as the uplink channel. In some cases, performing the second random or pseudo-random frequency hopping procedure within the set of downlink carriers includes: selecting the one of the set of downlink carriers based on a random or pseudo-random number generator. In some cases, performing the second random or pseudo-random frequency hopping procedure within the set of downlink carriers includes: selecting one of the set of data channels based on a random or pseudo-random hopping pattern.

Uplink communication channel selector 1040 may transmit an uplink communication on the selected uplink channel during the second time period, transmit a second uplink communication on the selected second uplink channel during the third time period, where the third time period is in the same frame, and transmit a second uplink communication on the selected second uplink channel during the fourth time period, where the first time period and the second time period are in a different frame than the third time period and the fourth time period. In some cases, the first time period and the second time period are in a same frame.

Transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
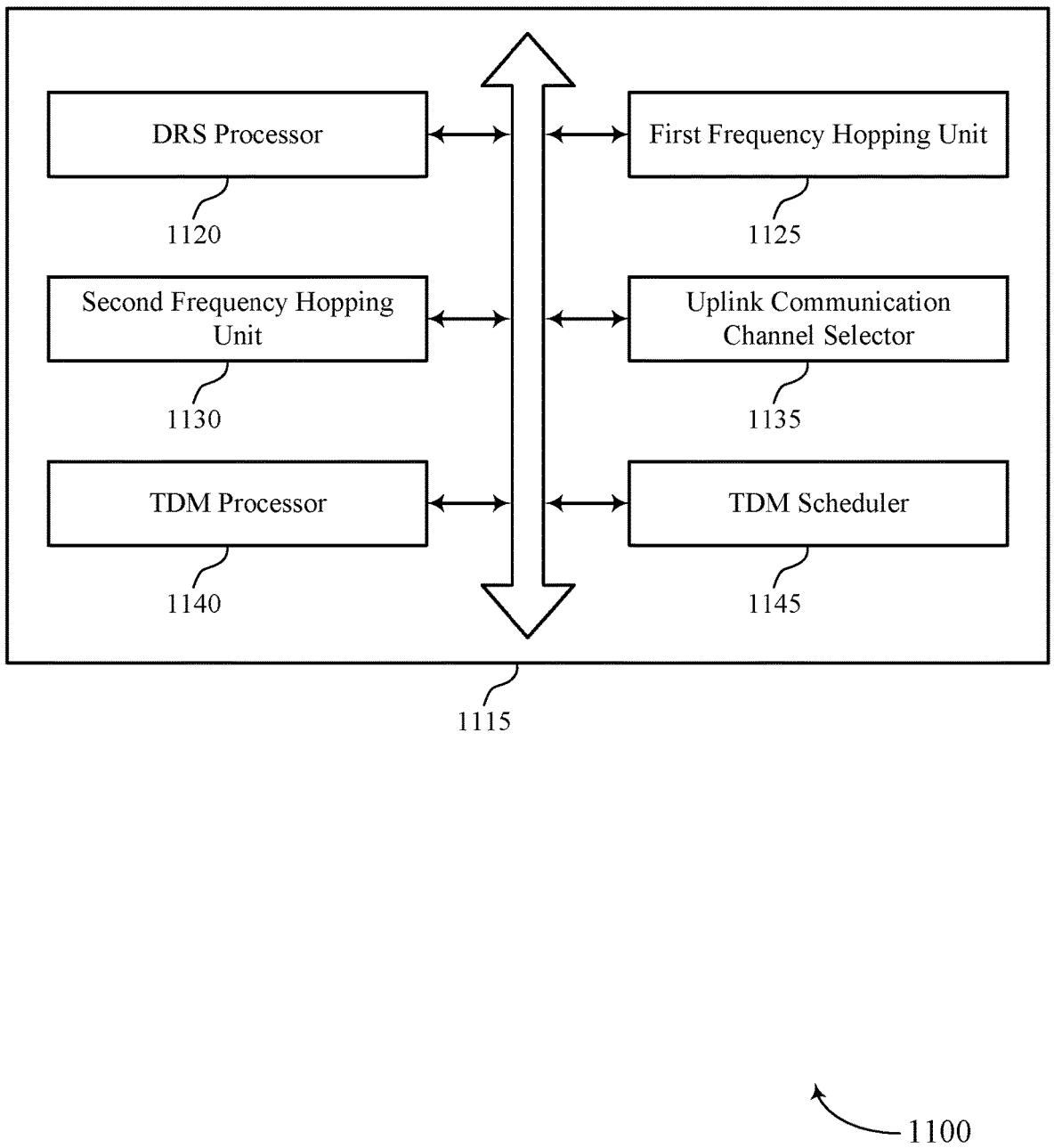

FIG. 11 shows a block diagram 1100 of a UE communications manager 1115 that supports nested frequency hopping for data transmission in accordance with aspects of the present disclosure. The UE communications manager 1115 may be an example of aspects of a UE communications manager 915, a UE communications manager 1015, or a UE communications manager 1215 described with reference to FIGS. 9, 10, and 12. The UE communications manager 1115 may include DRS processor 1120, first frequency hopping unit 1125, second frequency hopping unit 1130, uplink communication channel selector 1135, TDM processor 1140, and TDM scheduler 1145. Each of these modules may communicate, directly or indirectly, with one another (e.g., via one or more buses).

DRS processor 1120 may receive, by a wireless device, a discovery reference signal on at least one anchor carrier and receive, by the wireless device, a second discovery reference signal on the at least one anchor channel.

First frequency hopping unit 1125 may perform a first random or pseudorandom frequency hopping procedure to identify a set of downlink carriers for a first time period and perform a third random or pseudorandom frequency hopping procedure to identify a second set of downlink carriers for a third time period. In some cases, each of the set of downlink carriers includes a resource block.

Second frequency hopping unit 1130 may perform a second random or pseudorandom frequency hopping procedure within the set of downlink carriers to select one of the set of downlink channels as an uplink channel for a second time period, receive a downlink communication for the wireless device on a downlink channel of the set of downlink carriers, where the uplink channel is different than the downlink channel, select the uplink channel based on the permutation, perform a third random or pseudorandom frequency hopping procedure within the set of downlink carriers to select a second one of the set of downlink channels as a second uplink channel for a third time period, and perform a fourth random or pseudorandom frequency hopping procedure within the set of downlink carriers to select one of the second set of downlink channels as a second uplink channel for a fourth time period. In some cases, performing the second random or pseudo-random frequency hopping procedure within the set of downlink carriers includes: randomly or pseudo-randomly selecting the one of the set of downlink channels. In some cases, performing the second random or pseudo-random frequency hopping procedure within the set of downlink carriers includes: randomly or pseudo-randomly selecting a permutation of the set of downlink carriers. In some cases, performing the second random or pseudo-random frequency hopping within the set of downlink carriers includes: randomly or pseudo-randomly selecting a primary channel as the uplink channel. In some cases, performing the second random or pseudo-random frequency hopping procedure within the set of downlink carriers includes: selecting the one of the set of downlink carriers based on a random or pseudo-random number generator. In some cases, performing the second random or pseudo-random frequency hopping procedure within the set of downlink carriers includes: selecting one of the set of data channels based on a random or pseudo-random hopping pattern.

Uplink communication channel selector 1135 may transmit an uplink communication on the selected uplink channel during the second time period, transmit a second uplink communication on the selected second uplink channel during the third time period, where the third time period is in the same frame, and transmit a second uplink communication on the selected second uplink channel during the fourth time period, where the first time period and the second time period are in a different frame than the third time period and the fourth time period. In some cases, the first time period and the second time period are in a same frame.

TDM processor 1140 may receive, from a base station, time division multiplexing information for the uplink channel.

TDM scheduler 1145 may schedule transmission of uplink communications on a channel. In some cases, the uplink communication is transmitted based on the time division multiplexing information.

Figure 12:
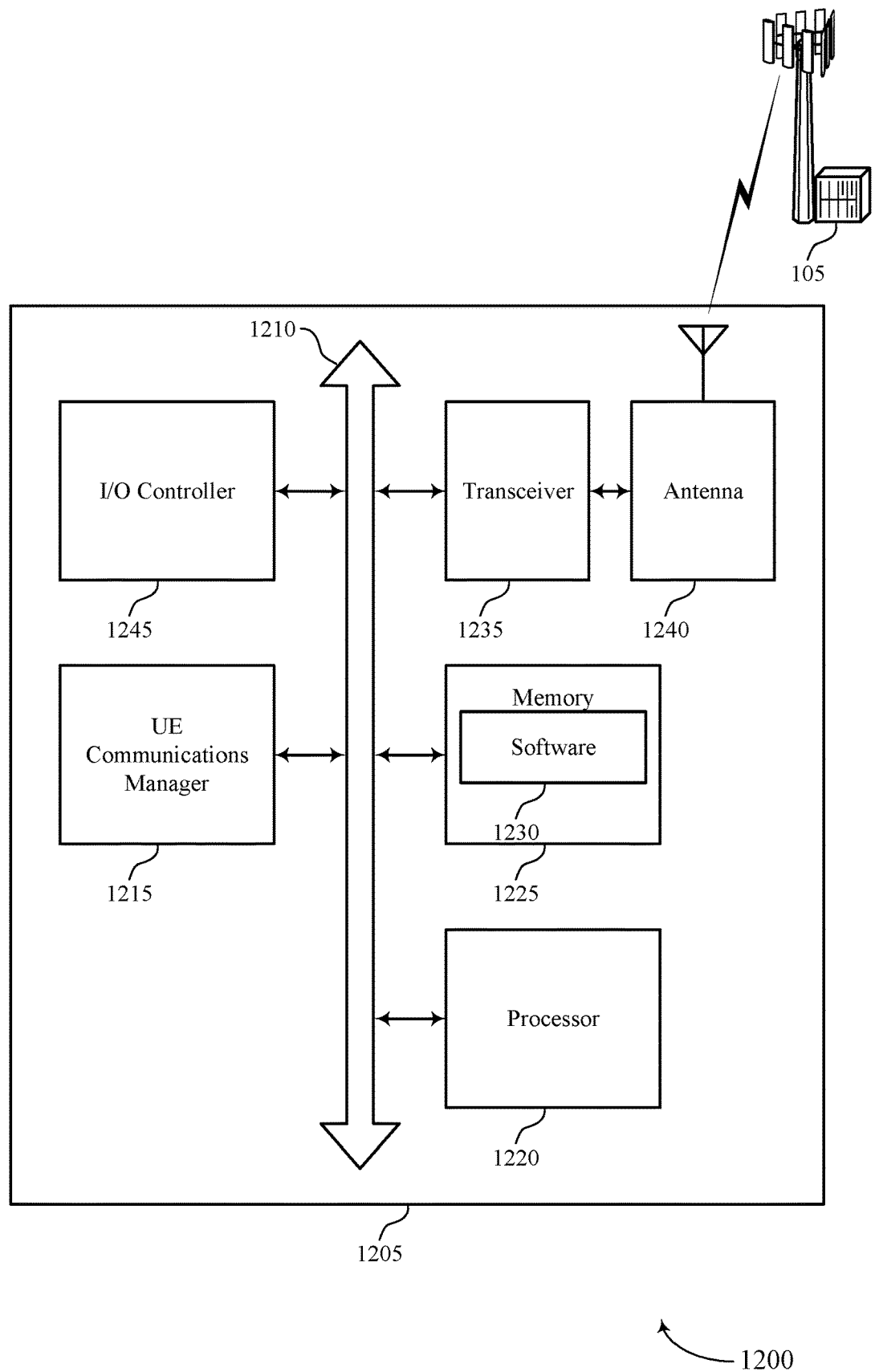
FIG. 12 illustrates a block diagram of a system including a UE that supports nested frequency hopping for data transmission in accordance with aspects of the present disclosure.

FIG. 12 shows a diagram of a system 1200 including a device 1205 that supports nested frequency hopping for data transmission in accordance with aspects of the present disclosure. Device 1205 may be an example of or include the components of wireless device 905, wireless device 1005, or a UE 115 as described above, e.g., with reference to FIGS. 9 and 10. Device 1205 may include components for bi-directional voice and data communications including components for transmitting and receiving communications, including UE communications manager 1215, processor 1220, memory 1225, software 1230, transceiver 1235, antenna 1240, and I/O controller 1245. These components may be in electronic communication via one or more buses (e.g., bus 1210). Device 1205 may communicate wirelessly with one or more base stations 105.

Processor 1220 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting nested frequency hopping for data transmission).

Memory 1225 may include random access memory (RAM) and read only memory (ROM). The memory 1225 may store computer-readable, computer-executable software 1230 including instructions that, when executed, cause the processor to perform various functions described herein. In some cases, the memory 1225 may contain, among other things, a basic input/output system (BIOS) which may control basic hardware or software operation such as the interaction with peripheral components or devices.

Software 1230 may include code to implement aspects of the present disclosure, including code to support nested frequency hopping for data transmission. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device 1205 may include a single antenna 1240. However, in some cases the device 1205 may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
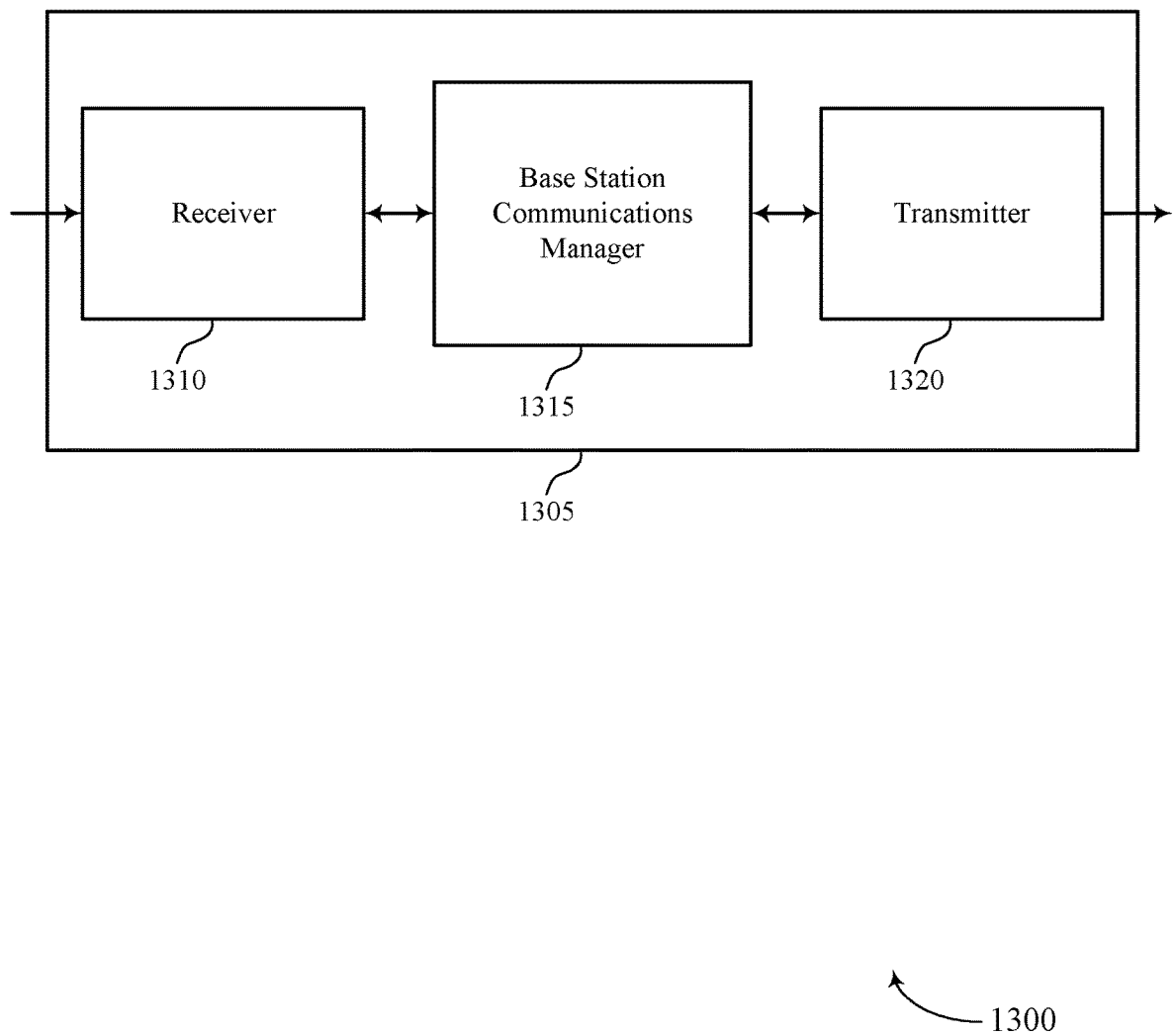
FIGS. 13 through 15 show block diagrams of a device that supports nested frequency hopping for data transmission in accordance with aspects of the present disclosure.

FIG. 13 shows a block diagram 1300 of a wireless device 1305 that supports nested frequency hopping for data transmission in accordance with aspects of the present disclosure. Wireless device 1305 may be an example of aspects of a base station 105 as described herein. Wireless device 1305 may include receiver 1310, base station communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to nested frequency hopping for data transmission, etc.). Information may be passed on to other components of the device 1305. The receiver 1310 may be an example of aspects of the transceiver 1635 described with reference to FIG. 16. The receiver 1310 may utilize a single antenna or a set of antennas.

Receiver 1310 may receive the uplink transmissions over the selected uplink channel during the second time period based on the time division multiplexing information.

Base station communications manager 1315 may be an example of aspects of the base station communications manager 1615 described with reference to FIG. 16.

Base station communications manager 1315 and/or at least some of its various sub-components may be implemented in hardware, software executed by a processor, firmware, or any combination thereof. If implemented in software executed by a processor, the functions of the base station communications manager 1315 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1315 and/or at least some of its various sub-components may be physically located at various positions, including being distributed such that portions of functions are implemented at different physical locations by one or more physical devices. In some examples, base station communications manager 1315 and/or at least some of its various sub-components may be a separate and distinct component in accordance with various aspects of the present disclosure. In other examples, base station communications manager 1315 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1315 may transmit, by a wireless device, a discovery reference signal on at least three anchor carriers, perform a first random or pseudorandom frequency hopping procedure to select a set of downlink carriers for a first time period, identify an anticipated collision of uplink transmissions from user equipment (UEs) during a second time period based on a second random or pseudorandom frequency hopping procedure within the set of downlink carriers, and transmit time division multiplexing information for the second time period to the UEs.

Transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1635 described with reference to FIG. 16. The transmitter 1320 may utilize a single antenna or a set of antennas.

Figure 14:
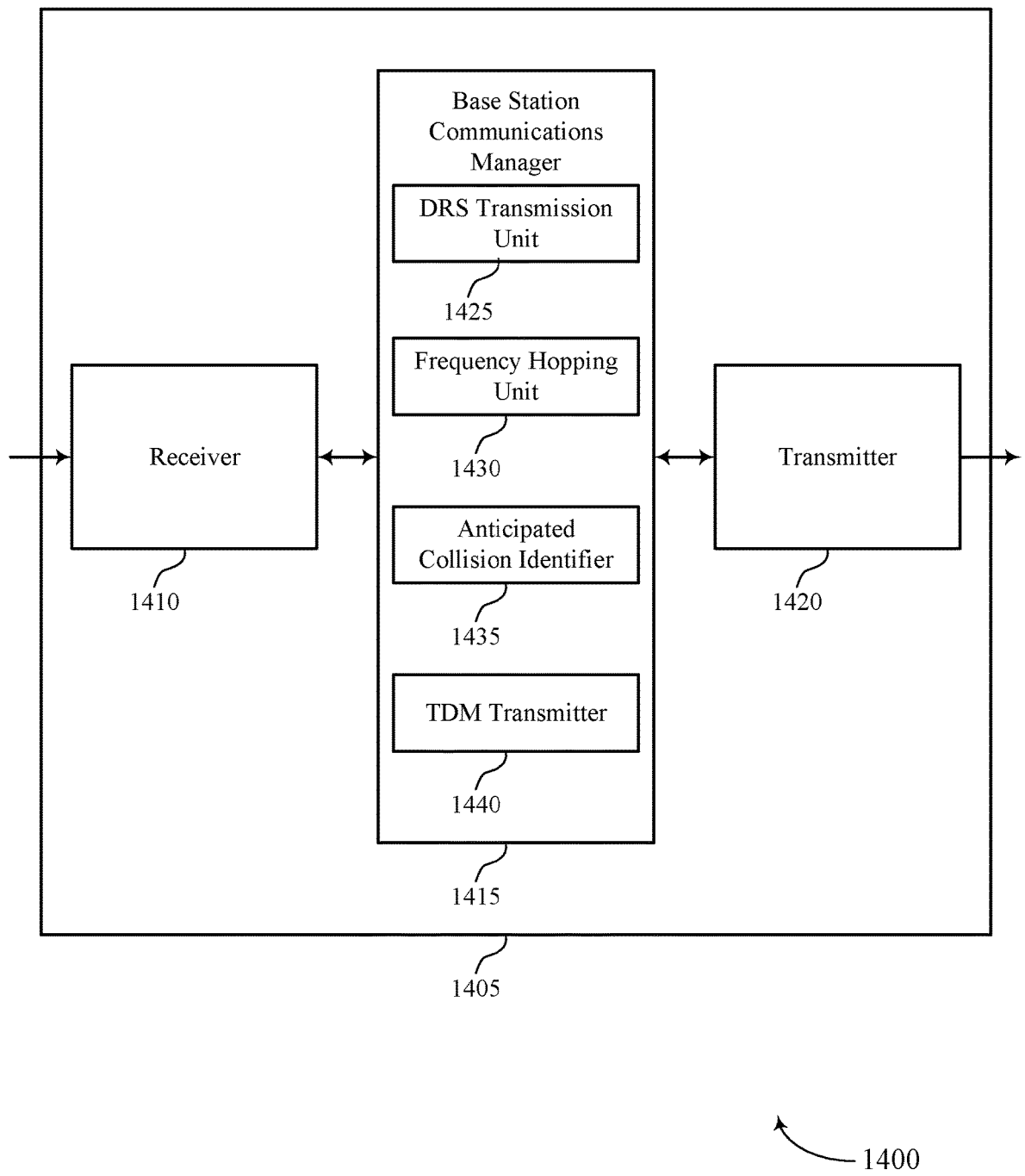

FIG. 14 shows a block diagram 1400 of a wireless device 1405 that supports nested frequency hopping for data transmission in accordance with aspects of the present disclosure. Wireless device 1405 may be an example of aspects of a wireless device 1305 or a base station 105 as described with reference to FIG. 13. Wireless device 1405 may include receiver 1410, base station communications manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to nested frequency hopping for data transmission, etc.). Information may be passed on to other components of the device 1405. The receiver 1410 may be an example of aspects of the transceiver 1635 described with reference to FIG. 16. The receiver 1410 may utilize a single antenna or a set of antennas.

Base station communications manager 1415 may be an example of aspects of the base station communications manager 1615 described with reference to FIG. 16.

Base station communications manager 1415 may also include DRS transmission unit 1425, frequency hopping unit 1430, anticipated collision identifier 1435, and TDM transmitter 1440.

DRS transmission unit 1425 may transmit, by a wireless device, a discovery reference signal on at least three anchor carriers.

Frequency hopping unit 1430 may perform a first random or pseudorandom frequency hopping procedure to select a set of downlink carriers for a first time period.

Anticipated collision identifier 1435 may identify an anticipated collision of uplink transmissions from user equipment (UEs) during a second time period based on a second random or pseudorandom frequency hopping procedure within the set of downlink carriers.

TDM transmitter 1440 may transmit time division multiplexing information for the second time period to the UEs and transmit a downlink communication on at least one of the set of downlink carriers, where the downlink communication includes the time division multiplexing information.

Transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1635 described with reference to FIG. 16. The transmitter 1420 may utilize a single antenna or a set of antennas.

Figure 15:
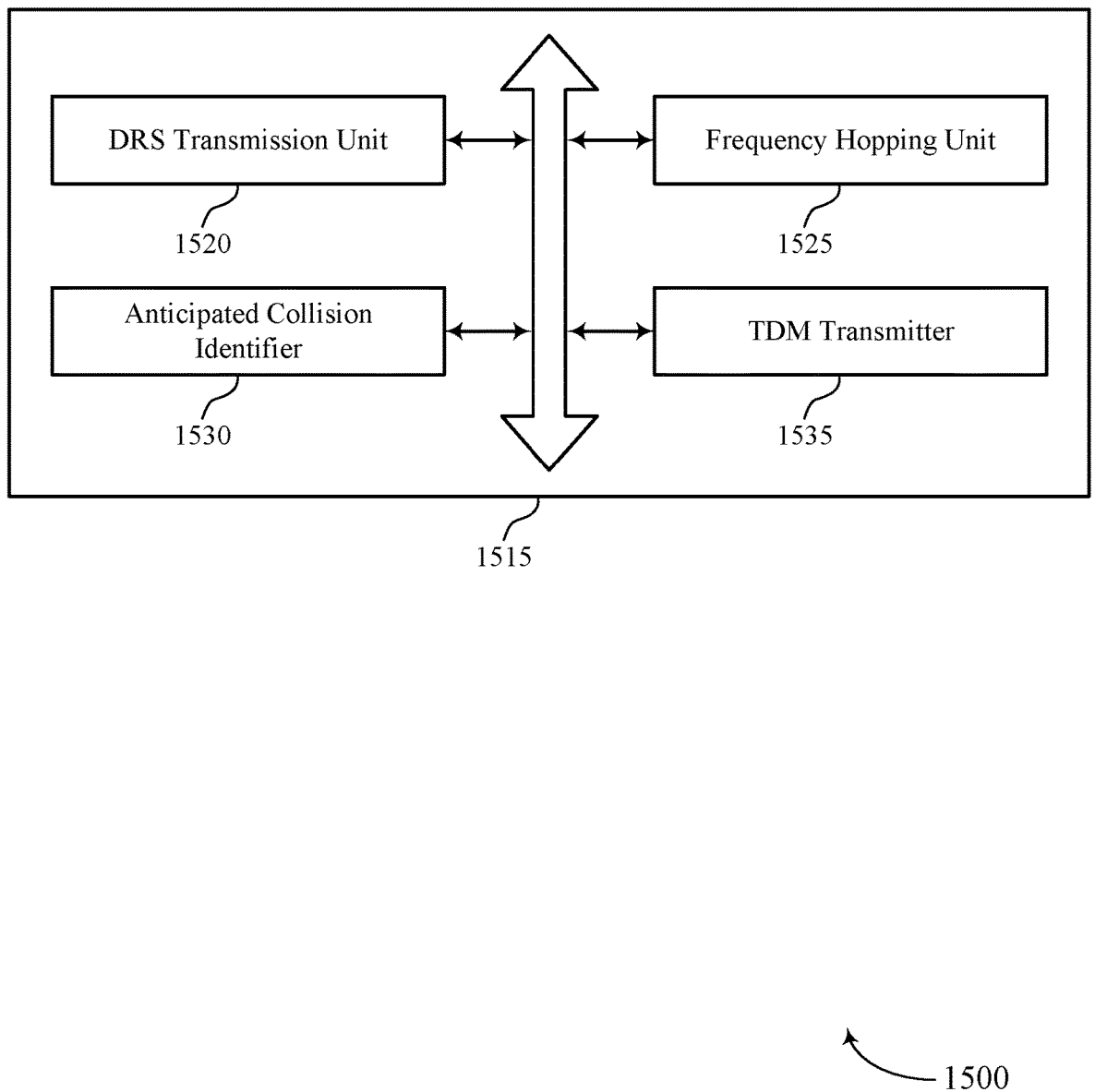

FIG. 15 shows a block diagram 1500 of a base station communications manager 1515 that supports nested frequency hopping for data transmission in accordance with aspects of the present disclosure. The base station communications manager 1515 may be an example of aspects of a base station communications manager 1615 described with reference to FIGS. 13, 14, and 16. The base station communications manager 1515 may include DRS transmission unit 1520, frequency hopping unit 1525, anticipated collision identifier 1530, and TDM transmitter 1535. Each of these modules may communicate, directly or indirectly, with one another (e.g., via one or more buses).

DRS transmission unit 1520 may transmit, by a wireless device, a discovery reference signal on at least three anchor carriers.

Frequency hopping unit 1525 may perform a first random or pseudorandom frequency hopping procedure to select a set of downlink carriers for a first time period.

Anticipated collision identifier 1530 may identify an anticipated collision of uplink transmissions from user equipment (UEs) during a second time period based on a second random or pseudorandom frequency hopping procedure within the set of downlink carriers.

TDM transmitter 1535 may transmit time division multiplexing information for the second time period to the UEs and transmit a downlink communication on at least one of the set of downlink carriers, where the downlink communication includes the time division multiplexing information.

Figure 16:
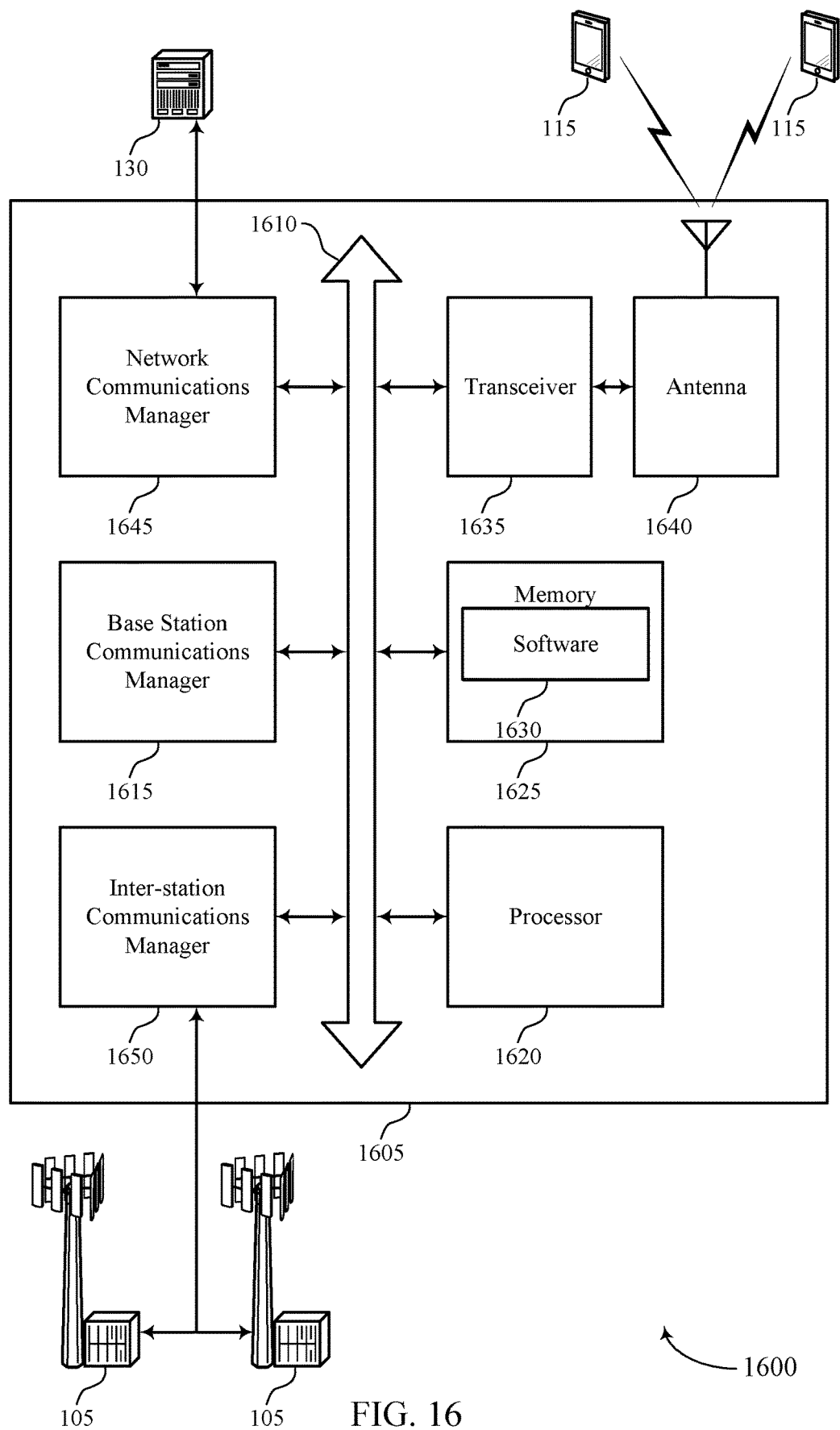
FIG. 16 illustrates a block diagram of a system including a base station that supports nested frequency hopping for data transmission in accordance with aspects of the present disclosure.

FIG. 16 shows a diagram of a system 1600 including a device 1605 that supports nested frequency hopping for data transmission in accordance with aspects of the present disclosure. Device 1605 may be an example of or include the components of base station 105 as described above, e.g., with reference to FIG. 1. Device 1605 may include components for bi-directional voice and data communications including components for transmitting and receiving communications, including base station communications manager 1615, processor 1620, memory 1625, software 1630, transceiver 1635, antenna 1640, network communications manager 1645, and inter-station communications manager 1650. These components may be in electronic communication via one or more buses (e.g., bus 1610). Device 1605 may communicate wirelessly with one or more UEs 115.

Processor 1620 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1620 may be configured to operate a memory array using a memory controller. In other cases, a memory controller may be integrated into processor 1620. Processor 1620 may be configured to execute computer-readable instructions stored in a memory to perform various functions (e.g., functions or tasks supporting nested frequency hopping for data transmission).

Memory 1625 may include RAM and ROM. The memory 1625 may store computer-readable, computer-executable software 1630 including instructions that, when executed, cause the processor to perform various functions described herein. In some cases, the memory 1625 may contain, among other things, a BIOS which may control basic hardware or software operation such as the interaction with peripheral components or devices.

Software 1630 may include code to implement aspects of the present disclosure, including code to support nested frequency hopping for data transmission. Software 1630 may be stored in a non-transitory computer-readable medium such as system memory or other memory. In some cases, the software 1630 may not be directly executable by the processor but may cause a computer (e.g., when compiled and executed) to perform functions described herein.

Transceiver 1635 may communicate bi-directionally, via one or more antennas, wired, or wireless links as described above. For example, the transceiver 1635 may represent a wireless transceiver and may communicate bi-directionally with another wireless transceiver. The transceiver 1635 may also include a modem to modulate the packets and provide the modulated packets to the antennas for transmission, and to demodulate packets received from the antennas.

In some cases, the wireless device 1605 may include a single antenna 1640. However, in some cases the device may have more than one antenna 1640, which may be capable of concurrently transmitting or receiving multiple wireless transmissions.

Network communications manager 1645 may manage communications with the core network (e.g., via one or more wired backhaul links). For example, the network communications manager 1645 may manage the transfer of data communications for client devices, such as one or more UEs 115.

Inter-station communications manager 1650 may manage communications with other base station 105, and may include a controller or scheduler for controlling communications with UEs 115 in cooperation with other base stations 105. For example, the inter-station communications manager 1650 may coordinate scheduling for transmissions to UEs 115 for various interference mitigation techniques such as beamforming or joint transmission. In some examples, inter-station communications manager 1650 may provide an X2 interface within an Long Term Evolution (LTE)/LTE-A wireless communication network technology to provide communication between base stations 105.

Figure 17:
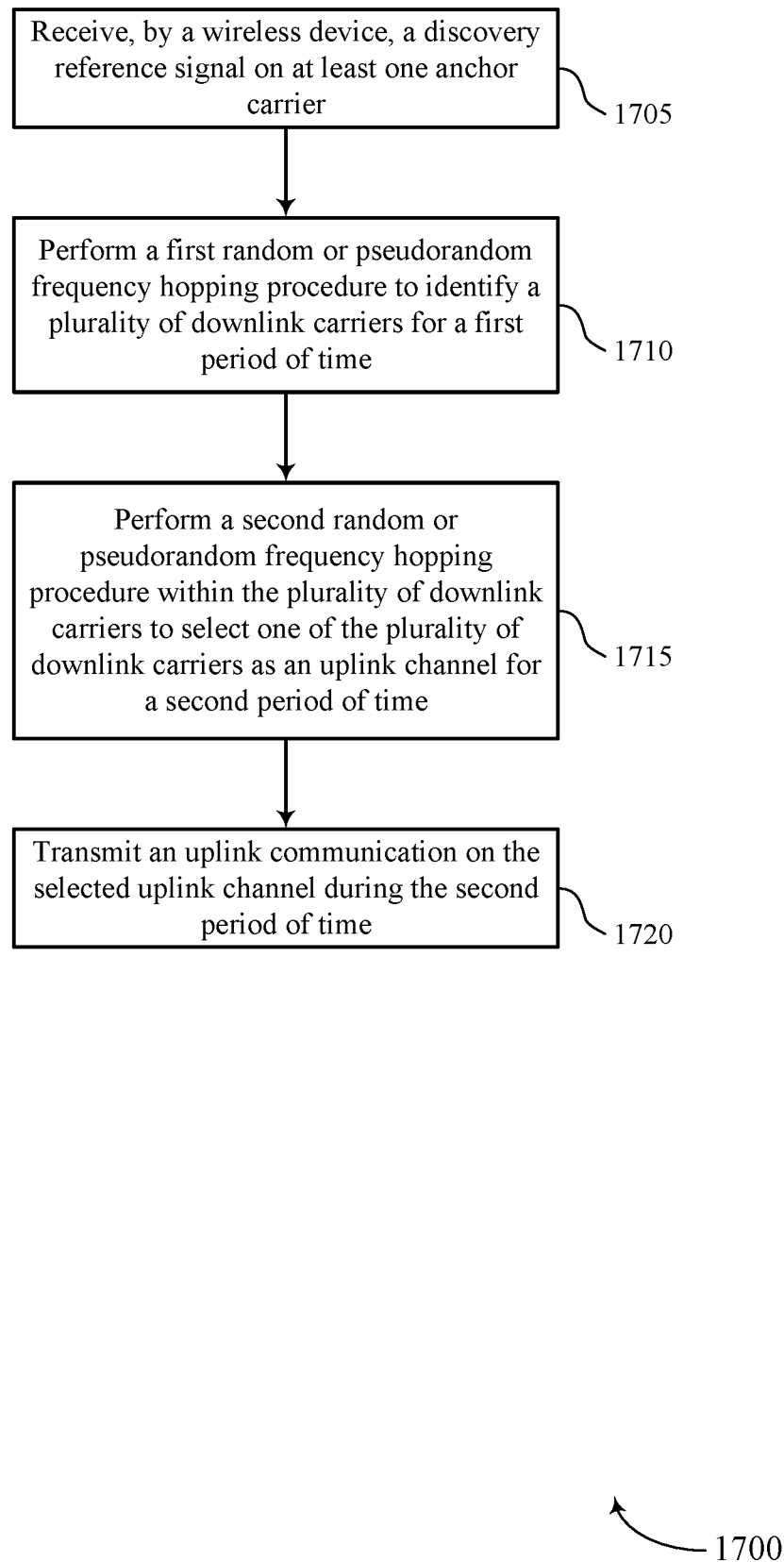
FIGS. 17 through 18 illustrate methods for nested frequency hopping for data transmission in accordance with aspects of the present disclosure.

FIG. 17 shows a flowchart illustrating a method 1700 for nested frequency hopping for data transmission in accordance with aspects of the present disclosure. The operations of method 1700 may be implemented by a UE 115 or its components as described herein. For example, the operations of method 1700 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At 1705, the UE 115 may receive, by a wireless device, a discovery reference signal on at least one anchor carrier. The operations of 1705 may be performed according to the methods described herein. In certain examples, aspects of the operations of 1705 may be performed by a DRS processor as described with reference to FIGS. 9 through 12.

At 1710, the UE 115 may perform a first random or pseudorandom frequency hopping procedure to identify a plurality of downlink carriers for a first time period. The operations of 1710 may be performed according to the methods described herein. In certain examples, aspects of the operations of 1710 may be performed by a first frequency hopping unit as described with reference to FIGS. 9 through 12.

At 1715, the UE 115 may perform a second random or pseudorandom frequency hopping procedure within the plurality of downlink carriers to select one of the plurality of downlink channels as an uplink channel for a second time period. The operations of 1715 may be performed according to the methods described herein. In certain examples, aspects of the operations of 1715 may be performed by a second frequency hopping unit as described with reference to FIGS. 9 through 12.

At 1720, the UE 115 may transmit an uplink communication on the selected uplink channel during the second time period. The operations of 1720 may be performed according to the methods described herein. In certain examples, aspects of the operations of 1720 may be performed by a uplink communication channel selector as described with reference to FIGS. 9 through 12.

Figure 18:
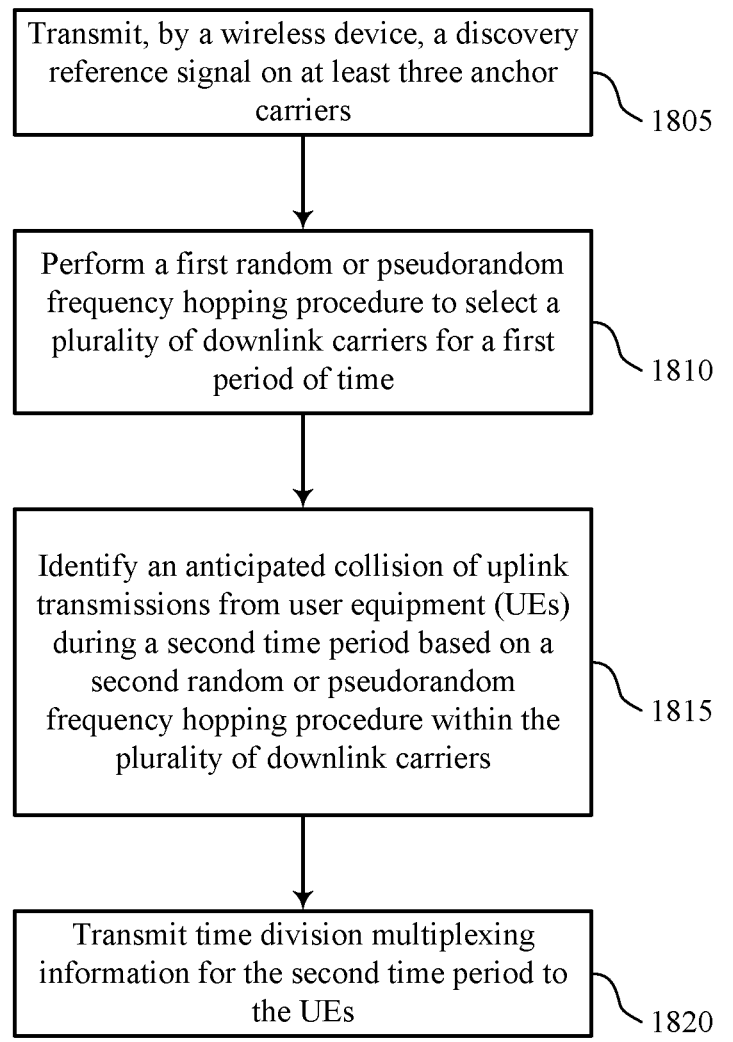

FIG. 18 shows a flowchart illustrating a method 1800 for nested frequency hopping for data transmission in accordance with aspects of the present disclosure. The operations of method 1800 may be implemented by a base station 105 or its components as described herein. For example, the operations of method 1800 may be performed by a base station communications manager as described with reference to FIGS. 13 through 16. In some examples, a base station 105 may execute a set of codes to control the functional elements of the device to perform the functions described below. Additionally or alternatively, the base station 105 may perform aspects of the functions described below using special-purpose hardware.

At 1805, the base station 105 may transmit, by a wireless device, a discovery reference signal on at least three anchor carriers. The operations of 1805 may be performed according to the methods described herein. In certain examples, aspects of the operations of 1805 may be performed by a DRS transmission unit as described with reference to FIGS. 13 through 16.

At 1810, the base station 105 may perform a first random or pseudorandom frequency hopping procedure to select a plurality of downlink carriers for a first time period. The operations of 1810 may be performed according to the methods described herein. In certain examples, aspects of the operations of 1810 may be performed by a frequency hopping unit as described with reference to FIGS. 13 through 16.

At 1815, the base station 105 may identify an anticipated collision of uplink transmissions from user equipment (UEs) during a second time period based at least in part on a second random or pseudorandom frequency hopping procedure within the plurality of downlink carriers. The operations of 1815 may be performed according to the methods described herein. In certain examples, aspects of the operations of 1815 may be performed by an anticipated collision identifier as described with reference to FIGS. 13 through 16.

At 1820, the base station 105 may transmit time division multiplexing information for the second time period to the UEs. The operations of 1820 may be performed according to the methods described herein. In certain examples, aspects of the operations of 1820 may be performed by a TDM transmitter as described with reference to FIGS. 13 through 16.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving, by a wireless device, a discovery reference signal on at least one anchor carrier;
   performing a first random or pseudorandom frequency hopping procedure to identify a plurality of downlink carriers for a first time period;
   performing a second random or pseudorandom frequency hopping procedure within the plurality of downlink carriers to select one of the plurality of downlink carriers as an uplink channel for a second time period;
   transmitting an uplink communication on the selected uplink channel during the second time period; and
   receiving a downlink communication for the wireless device on a downlink channel of the plurality of downlink carriers, wherein the uplink channel is different than the downlink channel.

2. The method of claim 1, wherein performing the second random or pseudo-random frequency hopping procedure within the plurality of downlink carriers comprises:
   randomly or pseudo-randomly selecting the one of the plurality of downlink carriers.

3. The method of claim 1, wherein performing the second random or pseudo-random frequency hopping procedure within the plurality of downlink carriers comprises:
   randomly or pseudo-randomly selecting a permutation of the plurality of downlink carriers; and
   selecting the uplink channel based at least in part on the permutation.

4. The method of claim 1, wherein performing the second random or pseudo-random frequency hopping within the plurality of downlink carriers comprises:
   randomly or pseudo-randomly selecting a primary channel as the uplink channel.

5. The method of claim 1, wherein performing the second random or pseudo-random frequency hopping procedure within the plurality of downlink carriers comprises:
   selecting the one of the plurality of downlink carriers based at least in part on a random or pseudo-random number generator.

6. The method of claim 1, wherein performing the second random or pseudo-random frequency hopping procedure within the plurality of downlink carriers comprises:
   selecting one of a plurality of data channels based at least in part on a random or pseudo-random hopping pattern.

7. The method of claim 1, further comprising:
   receiving, from a base station, time division multiplexing information for the uplink channel.

8. The method of claim 7, wherein the uplink communication is transmitted based at least in part on the time division multiplexing information.

9. The method of claim 1, wherein the first time period and the second time period are in a same frame.

10. The method of claim 9, further comprising:
    performing a third random or pseudorandom frequency hopping procedure within the plurality of downlink carriers to select a second one of the plurality of downlink carriers as a second uplink channel for a third time period; and
    transmitting a second uplink communication on the selected second uplink channel during the third time period, wherein the third time period is in the same frame.

11. The method of claim 1, wherein each of the plurality of downlink carriers comprises a resource block.

12. The method of claim 1, further comprising:
    receiving, by the wireless device, a second discovery reference signal on the at least one anchor carrier;
    performing a third random or pseudorandom frequency hopping procedure to identify a second plurality of downlink carriers for a third time period;
    performing a fourth random or pseudorandom frequency hopping procedure within the plurality of downlink carriers to select one of the second plurality of downlink carriers as a second uplink channel for a fourth time period; and
    transmitting a second uplink communication on the selected second uplink channel during the fourth time period, wherein the first time period and the second time period are in a different frame than the third time period and the fourth time period.

13. An apparatus for wireless communication, comprising:
    a processor;
    memory in electronic communication with the processor; and
    instructions stored in the memory, wherein the instructions are executable by the processor to:
        receive, by a wireless device, a discovery reference signal on at least one anchor carrier;
        perform a first random or pseudorandom frequency hopping procedure to identify a plurality of downlink carriers for a first time period;
        perform a second random or pseudorandom frequency hopping procedure within the plurality of downlink carriers to select one of the plurality of downlink carriers as an uplink channel for a second time period; and
        transmit an uplink communication on the selected uplink channel during the second time period; and
        receive a downlink communication for the wireless device on a downlink channel of the plurality of downlink carriers, wherein the uplink channel is different than the downlink channel.

14. The apparatus of claim 13, wherein the instructions executable by the processor to perform the second random or pseudo-random frequency hopping procedure within the plurality of downlink carriers comprise instructions executable by the processor to:
    randomly or pseudo-randomly selecting the one of the plurality of downlink carriers; or
    randomly or pseudo-randomly selecting a primary channel as the uplink channel.

15. The apparatus of claim 13, wherein the instructions executable by the processor to perform the second random or pseudo-random frequency hopping procedure within the plurality of downlink carriers comprise instructions executable by the processor to:
    randomly or pseudo-randomly select a permutation of the plurality of downlink carriers; and
    select the uplink channel based at least in part on the permutation.

16. The apparatus of claim 13, wherein the instructions executable by the processor to perform the second random or pseudo-random frequency hopping procedure within the plurality of downlink carriers comprise instructions executable by the processor to:
    select the one of the plurality of downlink carriers based at least in part on a random or pseudo-random number generator; or
    select one of a plurality of data channels based at least in part on a random or pseudo-random hopping pattern.

17. The apparatus of claim 13, wherein the instructions are further executable by the processor to:
    receive, from a base station, time division multiplexing information for the uplink channel.

18. The apparatus of claim 17, wherein the uplink communication is transmitted based at least in part on the time division multiplexing information.

19. The apparatus of claim 13, wherein the first time period and the second time period are in a same frame.

20. The apparatus of claim 19, wherein the instructions are further executable by the processor to:
    perform a third random or pseudorandom frequency hopping procedure within the plurality of downlink carriers to select a second one of the plurality of downlink carriers as a second uplink channel for a third time period; and
    transmit a second uplink communication on the selected second uplink channel during the third time period, wherein the third time period is in the same frame.

21. The apparatus of claim 13, wherein each of the plurality of downlink carriers comprises a resource block.

22. The apparatus of claim 13, wherein the instructions are further executable by the processor to:

receive, by the wireless device, a second discovery reference signal on the at least one anchor carrier;
perform a third random or pseudorandom frequency hopping procedure to identify a second plurality of downlink carriers for a third time period;
perform a fourth random or pseudorandom frequency hopping procedure within the plurality of downlink carriers to select one of the second plurality of downlink carriers as a second uplink channel for a fourth time period; and
transmit a second uplink communication on the selected second uplink channel during the fourth time period, wherein the first time period and the second time period are in a different frame than the third time period and the fourth time period.

* * * * *